(12) United States Patent
Kim et al.

(10) Patent No.: US 9,969,320 B2
(45) Date of Patent: May 15, 2018

(54) LAMP AND AUTONOMOUS VEHICLE

(71) Applicant: LG ELECTRONICS INC., Seoul (KR)

(72) Inventors: Cheolmun Kim, Seoul (KR); Sanghyuk Lee, Seoul (KR); Kihoon Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/689,523

(22) Filed: Aug. 29, 2017

(65) Prior Publication Data

US 2018/0056851 A1    Mar. 1, 2018

(30) Foreign Application Priority Data

Aug. 29, 2016   (KR) .................. 10-2016-0110293

(51) Int. Cl.
```
B60Q 1/02      (2006.01)
B60Q 1/08      (2006.01)
G08G 1/16      (2006.01)
G05D 1/00      (2006.01)
G06K 9/20      (2006.01)
```

(52) U.S. Cl.
CPC .......... B60Q 1/085 (2013.01); G05D 1/0061 (2013.01); G05D 1/0088 (2013.01); G06K 9/2027 (2013.01); G08G 1/161 (2013.01); B60Q 2300/41 (2013.01); B60Q 2300/42 (2013.01)

(58) Field of Classification Search
None
See application file for complete search history.

(56) References Cited

U.S. PATENT DOCUMENTS

2016/0167648 A1    6/2016   James et al.

FOREIGN PATENT DOCUMENTS

| DE | 102016008338 A1 * | 2/2017 | ............... B60Q 1/26 |
|----|---|---|---|
| JP | 2000293799 | 10/2000 | |
| JP | 2016005932 | 1/2016 | |
| JP | 2016005932 A * | 1/2016 | |
| JP | 2016049822 | 4/2016 | |
| KR | 101478073 | 1/2015 | |

OTHER PUBLICATIONS

Extended European Search Report in European Application No. 17000980.7, dated Nov. 23, 2017, 10 pages.

* cited by examiner

*Primary Examiner* — Dedei K Hammond
(74) *Attorney, Agent, or Firm* — Fish & Richardson P.C.

(57) ABSTRACT

A lamp of an autonomous vehicle may include at least one light emitting unit. The lamp may further include at least one processor configured to: in a first state in which the autonomous vehicle is operating in a manual driving state, control the at least one light emitting unit to emit a light into a space outside the autonomous vehicle; and in a second state in which the autonomous vehicle is transitioned from the manual driving state to an autonomous driving state, control the at least one light emitting unit to not emit a light into the space outside the autonomous vehicle.

20 Claims, 31 Drawing Sheets

LAMP AND AUTONOMOUS VEHICLE

CROSS-REFERENCE TO RELATED APPLICATION

This application claims the benefit of an earlier filing date and right of priority to Korean Patent Application No. 10-2016-0110293 filed on Aug. 29, 2016 in the Korean Intellectual Property Office, the disclosure of which is incorporated herein by reference.

TECHNICAL FIELD

The present disclosure generally relates to a lamp and an autonomous vehicle.

BACKGROUND

A vehicle is an apparatus that moves in a direction desired by a user riding therein. A common example of a vehicle is an automobile.

A vehicle typically implements a variety of sensors and electronic devices to improve convenience of users. For example, some vehicles implement an Advanced Driver Assistance System (ADAS). In addition, some vehicles are autonomous vehicles that autonomously perform one or more driving operations of the vehicle.

SUMMARY

Implementations disclosed herein enable adaptive control of one or more lamps of a vehicle based on a detected situation of the vehicle.

In one aspect, a lamp of an autonomous vehicle may include at least one light emitting unit; and at least one processor configured to: in a first state in which the autonomous vehicle is operating in a manual driving state, control the at least one light emitting unit to emit a light into a space outside the autonomous vehicle; and in a second state in which the autonomous vehicle is transitioned from the manual driving state to an autonomous driving state, control the at least one light emitting unit to not emit a light into the space outside the autonomous vehicle.

In some implementations, the at least one processor may be further configured to, in a third state in which the autonomous vehicle is transitioned from the autonomous driving state to the manual driving state: control the at least one light emitting unit to emit a light into the space outside the autonomous vehicle.

In some implementations, the lamp may further include an interface configured to receive driving situation information, wherein the at least one processor is configured to control the at least one light emitting unit based on the driving situation information.

In some implementations, the driving situation information may include at least one of the following: information regarding an object located in the vicinity of the autonomous vehicle, information regarding a road on which the autonomous vehicle is travelling, ambient illumination information, navigation information, or information regarding an object detection sensor being used by the autonomous vehicle in the autonomous driving state.

In some implementations, the information regarding the object may include information regarding a nearby vehicle travelling in the vicinity of the autonomous vehicle, and the at least one processor may be further configured to, in a fourth state in which the autonomous vehicle is operating in the autonomous driving state, control the at least one light emitting unit based on the information regarding the nearby vehicle.

In some implementations, the information regarding the nearby vehicle may include information as to whether the nearby vehicle is a manually driven vehicle. The at least one processor may be further configured to, in the fourth state in which the autonomous vehicle is operating in the autonomous driving state, control the at least one light emitting unit to emit a light into the space outside the autonomous vehicle in response to the nearby vehicle being determined to be a manually driven vehicle.

In some implementations, the at least one processor may be further configured to control the at least one light emitting unit based on a distance between the autonomous vehicle and the nearby vehicle.

In some implementations, the at least one processor may be further configured to: based on the distance between the autonomous vehicle and the nearby vehicle being equal to or less than a threshold distance, control the at least one light emitting unit to emit a light into the space outside the autonomous vehicle.

In some implementations, the information regarding the object may include information regarding at least one of a nearby vehicle, a two-wheeled vehicle, or a pedestrian being located within a threshold distance from the autonomous vehicle. The at least one processor may be further configured to, in the fourth state in which the autonomous vehicle is operating in the autonomous driving state, control the at least one light emitting unit to emit a light into the space outside the autonomous vehicle in response to acquisition of the information regarding the object.

In some implementations, the navigation information may include route information of the autonomous vehicle. The at least one processor may be further configured to control the at least one light emitting unit to display a visual image, corresponding to the route information, in the space outside the autonomous vehicle in a direction toward the object.

In some implementations, the information regarding the road on which the autonomous vehicle is travelling may include information indicating whether the road is an autonomous-vehicle-only road. The at least one processor may be further configured to, based on detecting that the autonomous vehicle is travelling on the autonomous-vehicle-only road, control the at least one light emitting unit to not emit a light into the space outside the autonomous vehicle.

In some implementations, the at least one processor may be configured to control the at least one light emitting unit based on the ambient illumination information by changing an amount of a light to be emitted into the space outside the autonomous vehicle.

In some implementations, the at least one processor may be configured to control the at least one light emitting unit based on the information regarding the object detection sensor being used by the autonomous vehicle in the autonomous driving state.

In some implementations, the at least one processor may be configured to: based on detecting that the object detection sensor being used by the autonomous vehicle in the autonomous driving state is a camera, control the at least one light emitting unit to emit a light into the space outside the autonomous vehicle, and based on detecting that the object detection sensor being used by the autonomous vehicle in the autonomous driving state is not a camera, control the at least one light emitting unit to not emit a light into the space outside the autonomous vehicle.

In some implementations, the information regarding the object may include information regarding at least one of a pedestrian, a two-wheeled vehicle, or a traffic sign plate. The at least one processor may be configured to control the at least one light emitting unit to emit a light of a predetermined range toward the at least one of the pedestrian, the two-wheeled vehicle, or the traffic sign plate.

In some implementations, the at least one light emitting unit may include: a first light emitting unit configured to implement a headlamp; and a second light emitting unit configured to implement rear combination lamps. The at least one processor may be further configured to: based on a determination that the autonomous vehicle is travelling amongst a group of nearby vehicles, control the at least one light emitting unit based on a position of the autonomous vehicle relative to other vehicles within the group.

In some implementations, the at least one processor may be further configured to: based on the autonomous vehicle being a lead vehicle in the group, control the first light emitting unit to emit a light toward a space in a forward direction from the autonomous vehicle.

In some implementations, the at least one processor may be further configured to: based on the autonomous vehicle being a rearmost vehicle in the group, control the second light emitting unit to emit a light toward a space in a rearward direction of the autonomous vehicle.

In some implementations, the at least one processor may be further configured to: based on the autonomous vehicle neither being a lead vehicle nor a rearmost vehicle in the group, control the light emitting unit to not emit a light into the space outside the autonomous vehicle.

In another aspect, a vehicle may include a lamp according to one or more implementations described above.

All or part of the features described throughout this disclosure may be implemented as a computer program product including instructions that are stored on one or more non-transitory machine-readable storage media, and that are executable on one or more processing devices. All or part of the features described throughout this disclosure may be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

In some implementations, an autonomous vehicle may operate in either an autonomous driving state or a manual driving state. The present disclosure describes systems and techniques that enable adaptive control of a vehicle lamp based on whether the vehicle is operating in the autonomous state or the manual state.

According to some implementations, light that is emitted from a lamp of an autonomous vehicle may be controlled based on a detected situation of the vehicle. Such adaptive control may be based on various types of information regarding the situation of the vehicle, and provide various features. For example, the adaptive control of the lamps may help improve energy efficiency of the autonomous vehicle by selectively controlling the lamp to only emit light in certain situations.

As another example, in some scenarios, the adaptive control of lamps may help improve driving safety. For example, in some implementations the vehicle may adaptively control one or more lamps based on a surrounding situation of the vehicle, such as whether the vehicle is driving in dark conditions. As such, implementations may adaptively illuminate the vehicle's surroundings and help improve recognition between the autonomous vehicle and a nearby vehicle that is manually driven, thus helping to prevent a possible accident.

A vehicle as described in this disclosure may include any suitable type of vehicle, such as an automobile or a motorcycle. Hereinafter, description will be given based on examples of an automobile.

A vehicle as described in this disclosure may be powered by any suitable power source, and may be an internal combustion engine vehicle including an engine as a power source, a hybrid vehicle including both an engine and an electric motor as a power source, or an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 1:
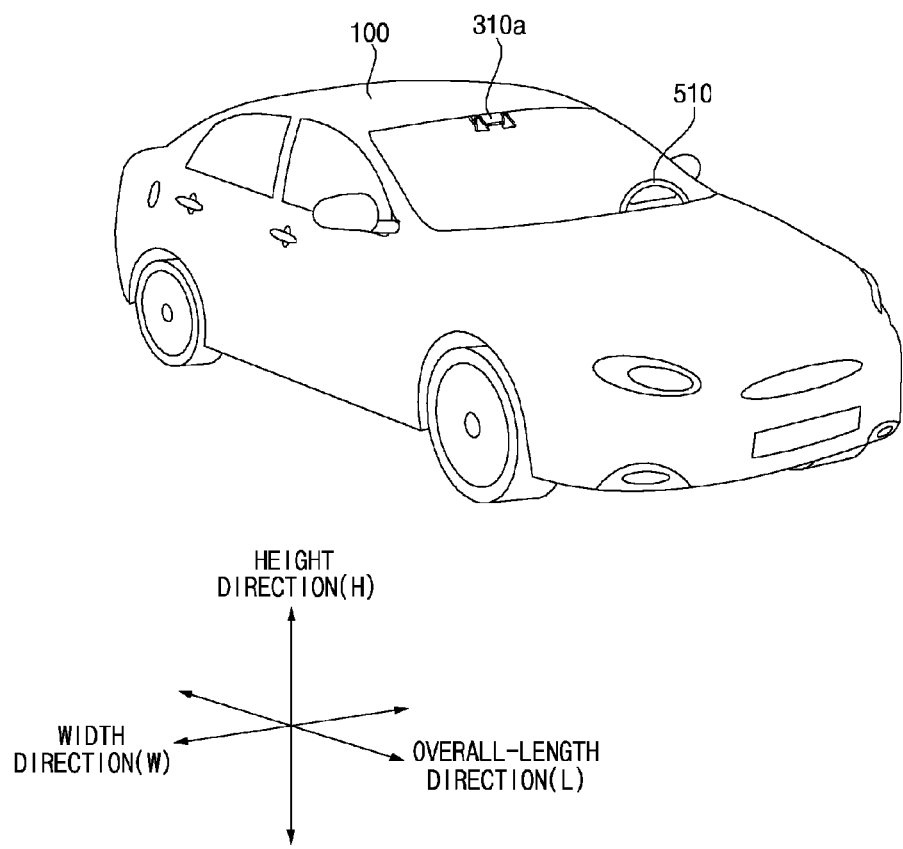
FIG. 1 is a diagram illustrating an example of an external appearance of a vehicle according to some implementations.

FIG. 1 is a view of the external appearance of a vehicle according to some implementations.

Figure 2:
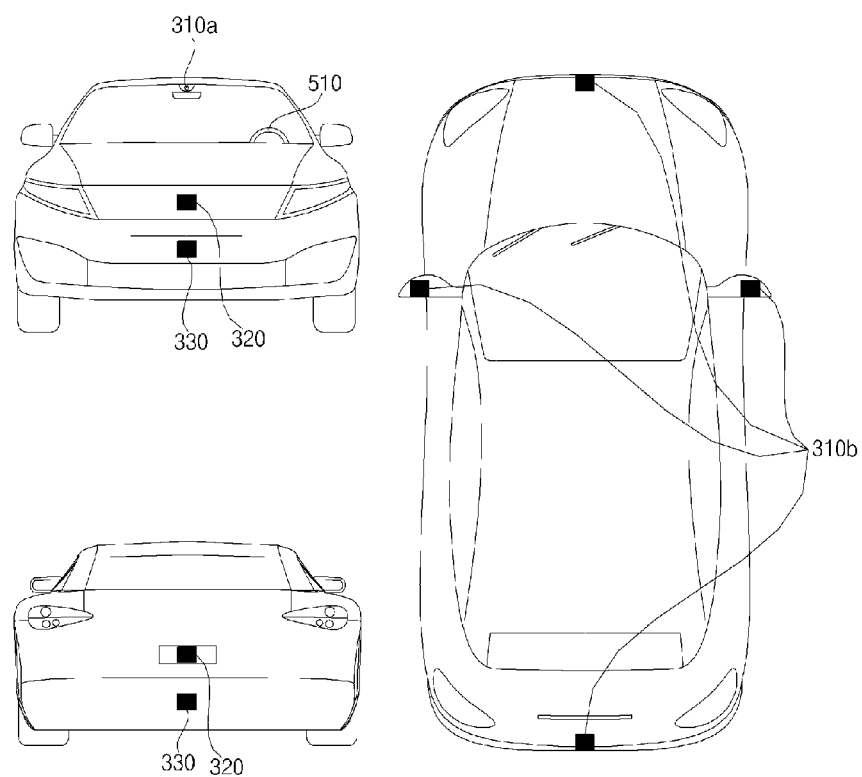
FIG. 2 are diagrams illustrating examples of different angled views of the external appearance of a vehicle according to some implementations.

FIG. 2 are different angled views of a vehicle according to some implementations.

Figure 3:
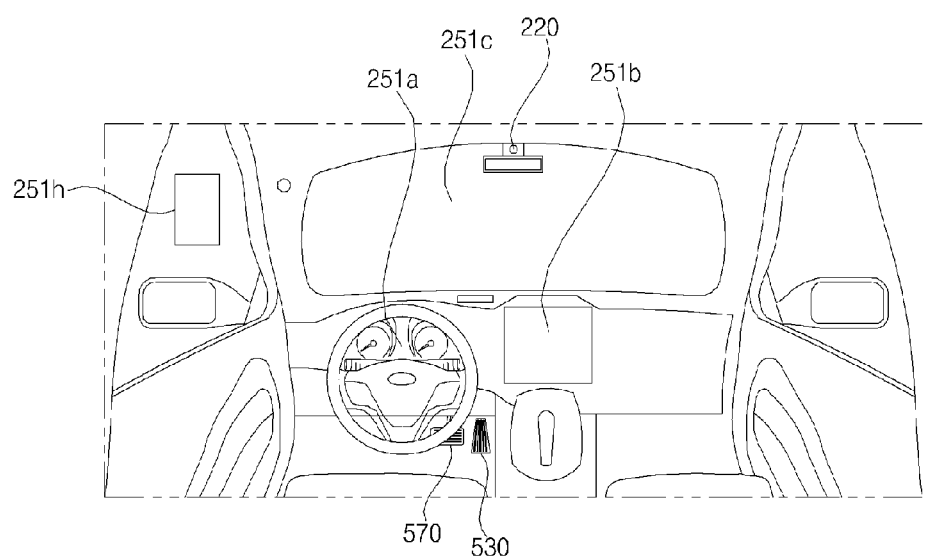
FIGS. 3 and 4 are diagrams illustrating examples of the interior configuration of a vehicle according to some implementations.
Figure 4:
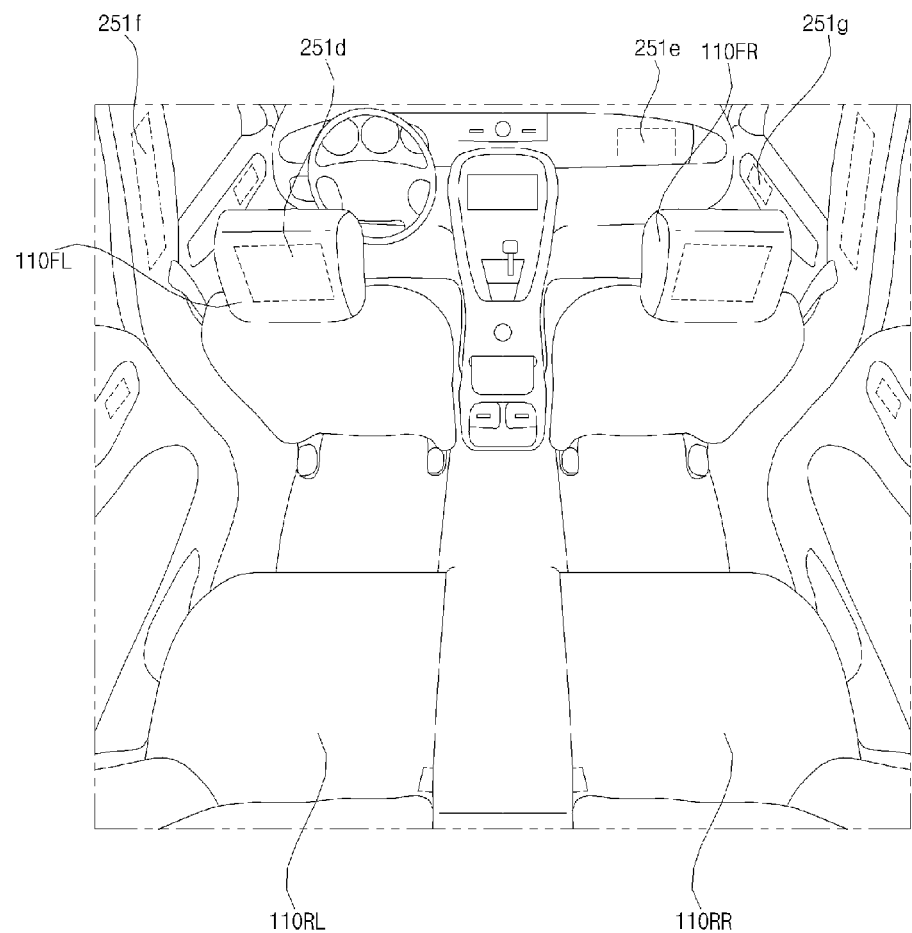

FIGS. 3 and 4 are views of the internal configuration of a vehicle according to some implementations.

Figure 5:
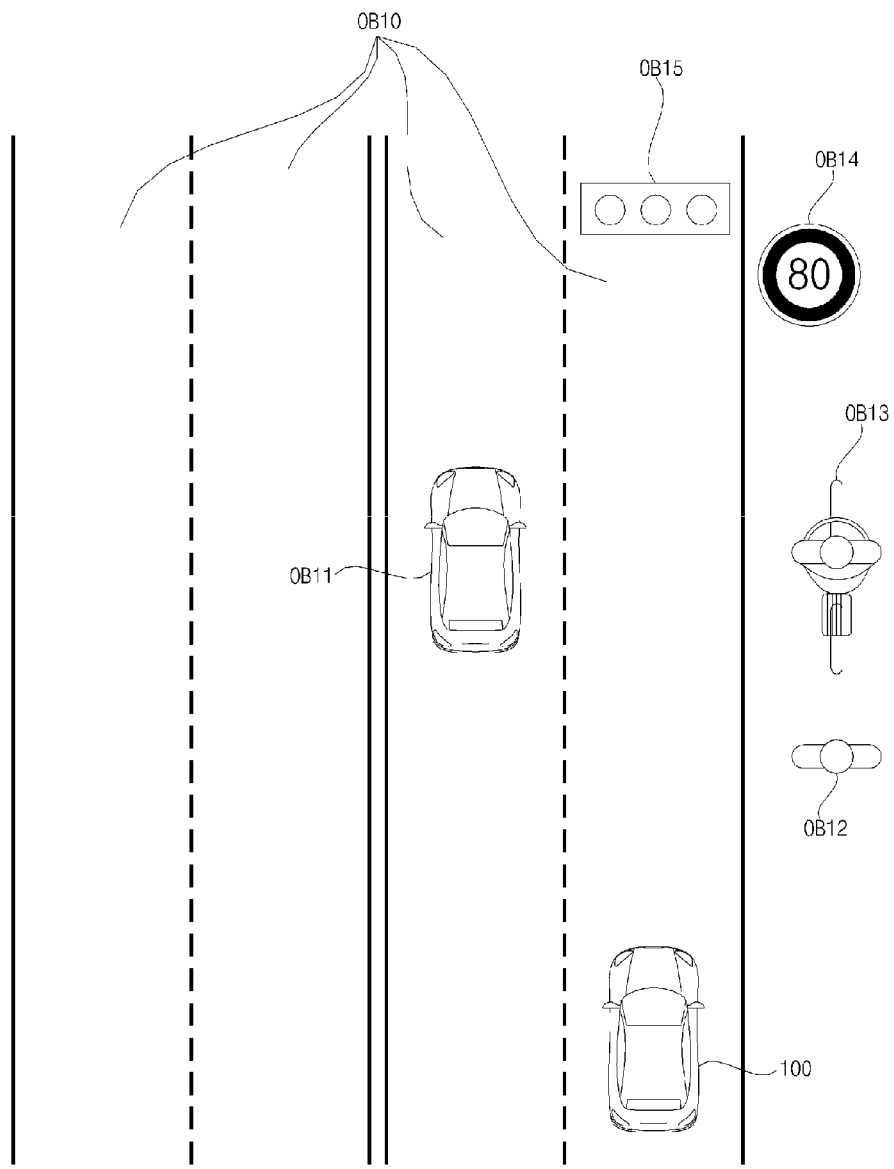
FIGS. 5 and 6 are diagrams illustrating examples of an object outside a vehicle, according to some implementations.
Figure 6:
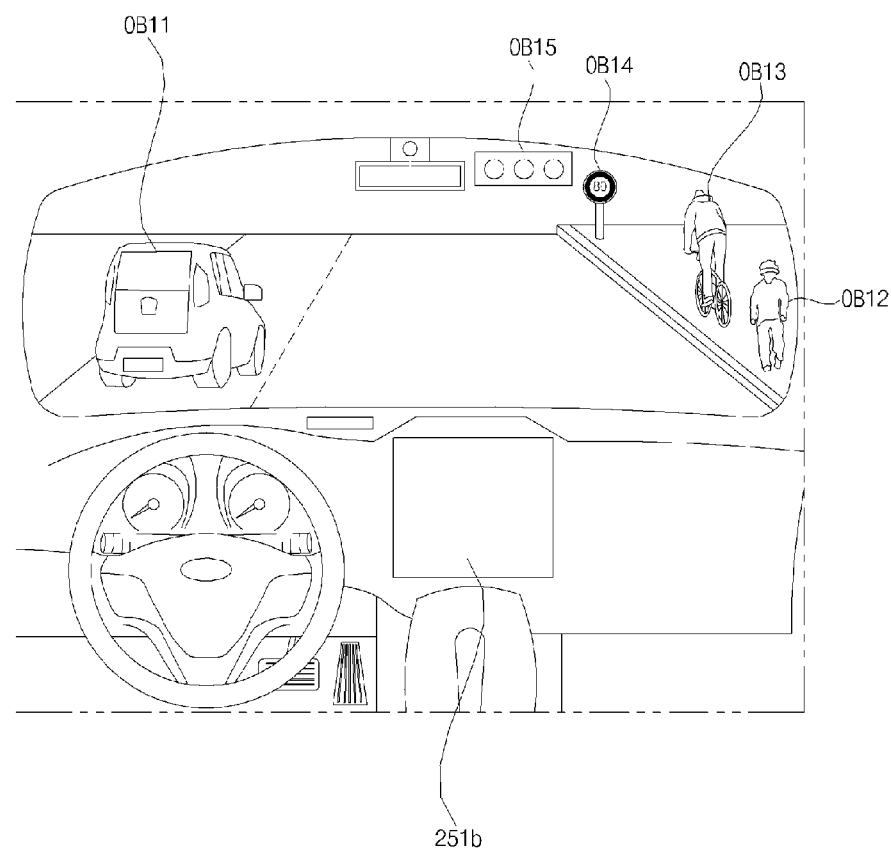

FIGS. 5 and 6 are views of objects outside a vehicle, according to some implementations.

Figure 7:
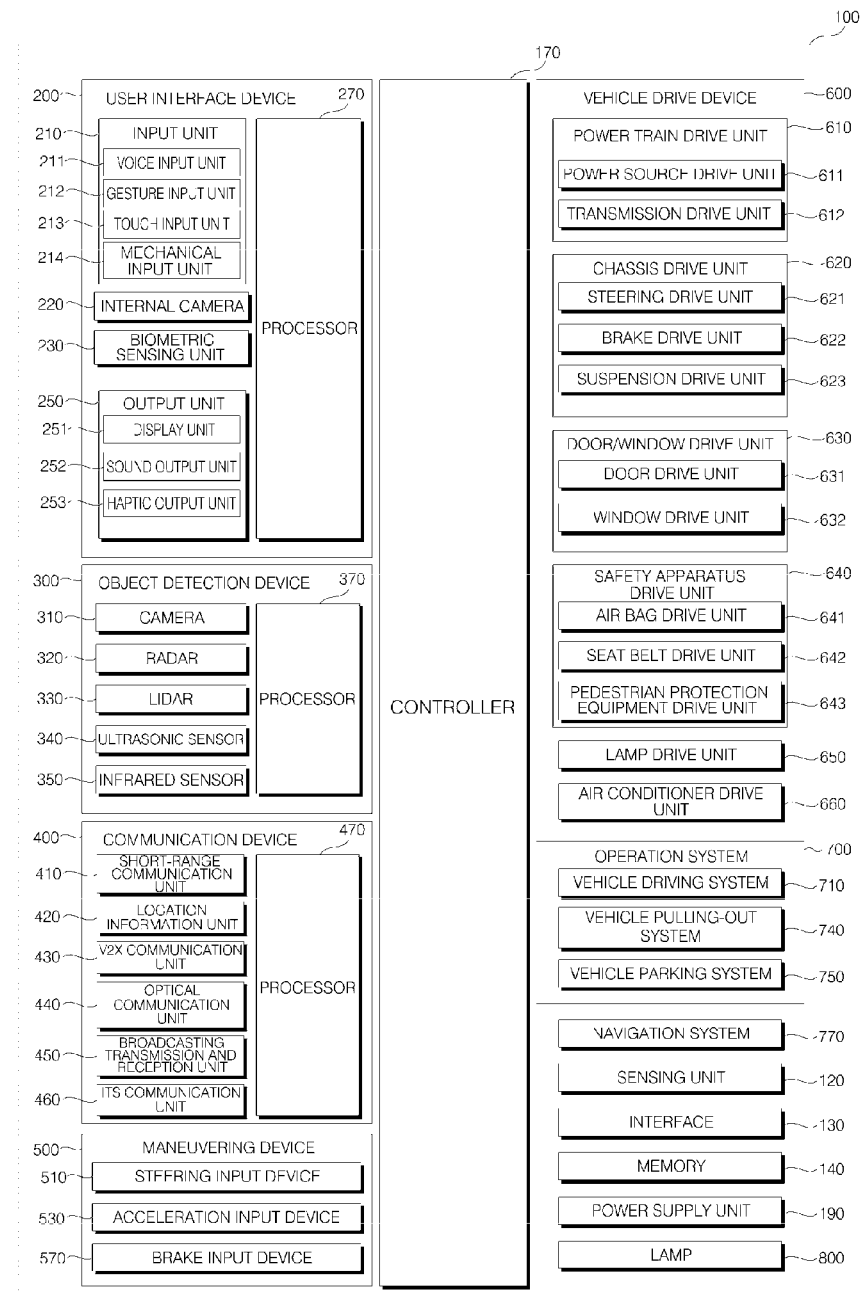
FIG. 7 is a block diagram illustrating an example of a vehicle according to some implementations.

FIG. 7 is a block diagram illustrating a vehicle according to some implementations.

Referring to FIGS. 1 to 7, a vehicle 100 may include a plurality of wheels, which are rotated by a power source, and a steering input device 510 for controlling a driving direction of the vehicle 100.

In some implementations, the vehicle 100 may be an autonomous vehicle that autonomously performs one or more driving operations.

In some scenarios, the vehicle 100 may be switched to an autonomous mode or a manual mode in response to a user input.

For example, in response to a user input received through a user interface device 200, the vehicle 100 may be switched from a manual mode to an autonomous mode, or vice versa.

The vehicle 100 may be switched to the autonomous mode or to the manual mode based on, for example, driving situation information. In some implementations, the driving situation information may be generated based on object information provided by an object detection device 300.

For example, the vehicle 100 may be switched from the manual mode to the autonomous mode, or vice versa, based on driving situation information generated by the object detection device 300.

In another example, the vehicle 100 may be switched from the manual mode to the autonomous mode, or vice versa, based on driving situation information received through a communication device 400.

The vehicle 100 may be switched from the manual mode to the autonomous mode, or vice versa, based on information, data, and a signal provided, for example, from an external device.

When the vehicle 100 operates in the autonomous mode, the autonomous vehicle 100 may operate based on an operation system 700.

For example, the autonomous vehicle 100 may operate based on information, data, or signals generated by a driving system 710, a vehicle pulling-out system 740, and a vehicle parking system 750.

While travelling in the manual mode, the autonomous vehicle 100 may receive a user input for driving of the vehicle 100 through a maneuvering device 500. In response to the user input received through the maneuvering device 500, the vehicle 100 may operate one or more driving operations.

As used in the present disclosure, the term "overall length" refers to a measure of a vehicle's length, such as the length from the front end to the rear end of the vehicle 100, the term "overall width" refers to a measure of the width of the vehicle 100, and the term "overall height" refers to a measure of the height of the vehicle, for example the height of the vehicle from the bottom of the wheels to the roof of the vehicle. In the following description, the term "overall length direction L" may refer to the reference direction for the measurement of the overall length of the vehicle 100, the term "overall width direction W" may refer to the reference direction for the measurement of the overall width of the vehicle 100, and the term "overall height direction H" may refer to the reference direction for the measurement of the overall height of the vehicle 100.

As illustrated in FIG. 7, the vehicle 100 may include the user interface device 200, the object detection device 300, the communication device 400, the maneuvering device 500, a vehicle drive device 600, the operation system 700, a navigation system 770, a sensing unit 120, an interface 130, a memory 140, a controller 170, a power supply unit 190, and a lamp 800. The controller 170 may be implemented, for example, by one or more processors.

In some implementations, the vehicle 100 may further include other components in addition to the aforementioned components, or may not include some of the aforementioned components.

The user interface device 200 is provided to support communication between the vehicle 100 and a user. The user interface device 200 may receive a user input, and provide information generated in the vehicle 100 to the user. The vehicle 100 may enable User Interfaces (UI) or User Experience (UX) through the user interface device 200.

The user interface device 200 may include an input unit 210, an internal camera 220, a biometric sensing unit 230, an output unit 250, and one or more processors, such as processor 270.

In some implementations, the user interface device 200 may further include other components in addition to the aforementioned components, or may not include some of the aforementioned components.

The input unit 210 is configured to receive information from a user, and data collected in the input unit 210 may be analyzed by the processor 270 and then processed into a control command of the user.

The input unit 210 may be disposed inside the vehicle 100. For example, the input unit 210 may be disposed in a region of a steering wheel, a region of an instrument panel, a region of a seat, a region of each pillar, a region of a door, a region of a center console, a region of a head lining, a region of a sun visor, a region of a windshield, or a region of a window.

The input unit 210 may include a voice input unit 211, a gesture input unit 212, a touch input unit 213, and a mechanical input unit 214.

The voice input unit 211 may convert a voice input of a user into an electrical signal. The converted electrical signal may be provided to the processor 270 or the controller 170.

The voice input unit 211 may include one or more microphones.

The gesture input unit 212 may convert a gesture input of a user into an electrical signal. The converted electrical signal may be provided to the processor 270 or the controller 170.

The gesture input unit 212 may include at least one selected from among an infrared sensor and an image sensor for sensing a gesture input of a user.

In some implementations, the gesture input unit 212 may sense a three-dimensional (3D) gesture input of a user. To this end, the gesture input unit 212 may include a plurality of light emitting units for emitting infrared light, or a plurality of image sensors.

The gesture input unit 212 may sense the 3D gesture input by employing a Time of Flight (TOF) scheme, a structured light scheme, or a disparity scheme.

The touch input unit 213 may convert a user's touch input into an electrical signal. The converted electrical signal may be provided to the processor 270 or the controller 170.

The touch input unit 213 may include a touch sensor for sensing a touch input of a user.

In some implementations, the touch input unit 210 may be formed integral with a display unit 251 to implement a touch screen. The touch screen may provide an input interface and an output interface between the vehicle 100 and the user.

The mechanical input unit 214 may include at least one selected from among a button, a dome switch, a jog wheel, and a jog switch. An electrical signal generated by the mechanical input unit 214 may be provided to the processor 270 or the controller 170.

The mechanical input unit 214 may be located on a steering wheel, a center fascia, a center console, a cockpit module, a door, etc.

The internal camera 220 may acquire images of the inside of the vehicle 100. The processor 270 may sense a user's condition based on the images of the inside of the vehicle 100. The processor 270 may acquire information on an eye gaze of the user. The processor 270 may sense a gesture of the user from the images of the inside of the vehicle 100.

The biometric sensing unit 230 may acquire biometric information of the user. The biometric sensing unit 230 may include a sensor for acquire biometric information of the user, and may utilize the sensor to acquire finger print information, heart rate information, etc. of the user. The biometric information may be used for user authentication.

The output unit 250 is configured to generate a visual, audio, or tactile output.

The output unit 250 may include at least one selected from among a display unit 251, a sound output unit 252, and a haptic output unit 253.

The display unit 251 may display graphic objects corresponding to various types of information.

The display unit 251 may include at least one selected from among a Liquid Crystal Display (LCD), a Thin Film Transistor-Liquid Crystal Display (TFT LCD), an Organic Light-Emitting Diode (OLED), a flexible display, a 3D display, and an e-ink display.

The display unit 251 may form an inter-layer structure together with the touch input unit 213, or may be integrally formed with the touch input unit 213 to implement a touch screen.

The display unit 251 may be implemented as a Head Up Display (HUD). When implemented as a HUD, the display unit 251 may include a projector module in order to output information through an image projected on a windshield or a window.

The display unit 251 may include a transparent display. The transparent display may be attached on the windshield or the window.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent Light Emitting Diode (LED) display. The transparency of the transparent display may be adjustable.

In some implementations, the user interface device 200 may include a plurality of display units 251a to 251g.

The display unit 251 may be disposed in a region of a steering wheel, a region 251a, 251b or 251e of an instrument panel, a region 251d of a seat, a region 251f of each pillar, a region 251g of a door, a region of a center console, a region of a head lining, a region of a sun visor, a region 251c of a windshield, or a region 251h of a window.

The sound output unit 252 converts an electrical signal from the processor 270 or the controller 170 into an audio signal, and outputs the audio signal. To this end, the sound output unit 252 may include one or more speakers.

The haptic output unit 253 generates a tactile output. For example, the haptic output unit 253 may operate to vibrate a steering wheel, a safety belt, and seats 110FL, 110FR, 110RL, and 110RR so as to allow a user to recognize the output.

The processor 270 may control the overall operation of each unit of the user interface device 200.

In some implementations, the user interface device 200 may include a plurality of processors 270 or may not include the processor 270.

In a case where the user interface device 200 does not include the processor 270, the user interface device 200 may operate under control of the controller 170 or a processor of a different device inside the vehicle 100.

As an example, the user interface device 200 may be a display device for vehicle.

The user interface device 200 may operate under control of the controller 170.

The object detection device 300 is configured to detect an object outside the vehicle 100.

The object may include various objects related to travelling of the vehicle 100.

Referring to FIGS. 5 and 6, an object "o" may include a lane OB10, a nearby vehicle OB11, a pedestrian OB12, a two-wheeled vehicle OB13, a traffic signal OB14 and OB15, a light, a road, a structure, a bump, a geographical feature, an animal, etc.

The lane OB10 may be a lane in which the vehicle 100 is traveling, a lane next to the lane in which the vehicle 100 is traveling, and a lane in which a vehicle is travelling in the opposite direction. The lane OB10 may include left and right lines that define the lane.

The nearby vehicle OB11 may be a vehicle that is travelling in the vicinity of the vehicle 100. The nearby vehicle OB11 may be a vehicle located within a predetermined distance from the vehicle 100. For example, the nearby vehicle OB11 may be a vehicle that is preceding or following the vehicle 100.

The pedestrian OB12 may be a person in the vicinity of the vehicle 100. The pedestrian OB12 may be a person located within a predetermined distance from the vehicle 100. For example, the pedestrian OB12 may be a person on a sidewalk or on the roadway.

The two-wheeled vehicle OB13 is a vehicle that is in the vicinity of the vehicle 100 and moves using two wheels. The two-wheeled vehicle OB13 may be a vehicle that has two wheels located within a predetermined distance from the vehicle 100. For example, the two-wheeled vehicle OB13 may be a motorcycle or a bike on a sidewalk or the roadway.

The traffic signal may include a traffic light OB15, a traffic sign plate OB14, and a pattern or text painted on a road surface.

The light may be light generated by a lamp provided in the nearby vehicle. The light may be light generated by a street light. The light may be solar light.

The road may include a road surface, a curve, and slopes, such as an upward slope and a downward slope.

The structure may be a body located around the road in the state of being fixed onto the ground. For example, the structure may include a streetlight, a roadside tree, a building, a traffic light, and a bridge.

The geographical feature may include a mountain and a hill.

In some implementations, the object may be classified as a movable object or a stationary object. For example, the movable object may include a nearby vehicle and a pedestrian. For example, the stationary object may include a traffic signal, a road, and a structure.

The object detection device 300 may include a camera 310, a radar 320, a lidar 330, an ultrasonic sensor 340, an infrared sensor 350, and one or more processors, such as processor 370.

In some implementations, the object detection device 300 may further include other components in addition to the aforementioned components, or may not include some of the aforementioned components.

The camera 310 may be located at an appropriate position outside the vehicle 100 in order to acquire images of the outside of the vehicle 100. The camera 310 may be a mono camera, a stereo camera 310*a*, an Around View Monitoring (AVM) camera 310*b*, or a 360-degree camera.

Using various image processing algorithms, the camera 310 may acquire location information of an object, information on distance to the object, and information on speed relative to the object.

For example, based on change in size over time of an object in acquired images, the camera 310 may acquire information on distance to the object and information on speed relative to the object.

For example, the camera 310 may acquire the information on distance to the object and the information on speed relative to the object by utilizing a pin hole model or by profiling a road surface.

For example, the camera 310 may acquire the information on distance to the object and the information on the speed relative to the object, based on information on disparity of stereo images acquired by a stereo camera 310*a*.

For example, the camera 310 may be disposed near a front windshield in the vehicle 100 in order to acquire images of the front of the vehicle 100. Alternatively, the camera 310 may be disposed around a front bumper or a radiator grill.

In another example, the camera 310 may be disposed near a rear glass in the vehicle 100 in order to acquire images of the rear of the vehicle 100. Alternatively, the camera 310 may be disposed around a rear bumper, a trunk, or a tailgate.

In yet another example, the camera 310 may be disposed near at least one of the side windows in the vehicle 100 in order to acquire images of the side of the vehicle 100. Alternatively, the camera 310 may be disposed around a side mirror, a fender, or a door.

The camera 310 may provide an acquired image to the processor 370.

The radar 320 may include an electromagnetic wave transmission unit and an electromagnetic wave reception unit. The radar 320 may be realized as a pulse radar or a continuous wave radar depending on the principle of emission of an electronic wave. In addition, the radar 320 may be realized as a Frequency Modulated Continuous Wave (FMCW) type radar or a Frequency Shift Keying (FSK) type radar depending on the waveform of a signal.

The radar 320 may detect an object through the medium of an electromagnetic wave by employing a time of flight (TOF) scheme or a phase-shift scheme, and may detect a location of the detected object, the distance to the detected object, and the speed relative to the detected object.

The radar 320 may be located at an appropriate position outside the vehicle 100 in order to sense an object located in front of the vehicle 100, an object located to the rear of the vehicle 100, or an object located to the side of the vehicle 100.

The lidar 330 may include a laser transmission unit and a laser reception unit. The lidar 330 may be implemented by the TOF scheme or the phase-shift scheme.

The lidar 330 may be implemented as a drive type lidar or a non-drive type lidar.

When implemented as the drive type lidar, the lidar 300 may rotate by a motor and detect an object in the vicinity of the vehicle 100.

When implemented as the non-drive type lidar, the lidar 300 may utilize a light steering technique to detect an object located within a predetermined distance from the vehicle 100.

The lidar 330 may detect an object through the medium of laser light by employing the TOF scheme or the phase-shift scheme, and may detect a location of the detected object, the distance to the detected object, and the speed relative to the detected object.

The lidar 330 may be located at an appropriate position outside the vehicle 100 to sense an object located in front of the vehicle 100, an object located to the rear of the vehicle 100, or an object located to the side of the vehicle 100.

The ultrasonic sensor 340 may include an ultrasonic wave transmission unit and an ultrasonic wave reception unit. The ultrasonic sensor 340 may detect an object based on an ultrasonic wave, and may detect a location of the detected object, the distance to the detected object, and the speed relative to the detected object.

The ultrasonic sensor 340 may be located at an appropriate position outside the vehicle 100 to detect an object located in front of the vehicle 100, an object located to the rear of the vehicle 100, and an object located to the side of the vehicle 100.

The infrared sensor 350 may include an infrared light transmission unit and an infrared light reception unit. The infrared sensor 350 may detect an object based on infrared light, and may detect a location of the detected object, the distance to the detected object, and the speed relative to the detected object.

The infrared sensor 350 may be located at an appropriate position outside the vehicle 100 to sense an object located in front of the vehicle 100, an object located to the rear of the vehicle 100, or an object located to the side of the vehicle 100.

The processor 370 may control the overall operation of each unit of the object detection device 300.

The processor 370 may detect and track an object based on acquired images. The processor 370 may, for example, calculate the distance to the object and the speed relative to the object.

For example, the processor 370 may acquire information on the distance to the object and information on the speed relative to the object based on a variation in size over time of the object in acquired images.

In another example, the processor 370 may acquire information on the distance to the object or information on the speed relative to the object by employing a pin hole model or by profiling a road surface.

In yet another example, the processor 370 may acquire information on the distance to the object and information on the speed relative to the object based on information on disparity of stereo images acquired from the stereo camera 310a.

The processor 370 may detect and track an object based on a reflection electromagnetic wave which is formed as the result of reflection a transmission electromagnetic wave by the object. Based on the electromagnetic wave, the processor 370 may, for example, calculate the distance to the object and the speed relative to the object.

The processor 370 may detect and track an object based on a reflection laser light which is formed as the result of reflection of transmission laser by the object. Based on the laser light, the processor 370 may, for example, calculate the distance to the object and the speed relative to the object.

The processor 370 may detect and track an object based on a reflection ultrasonic wave which is formed as the result of reflection of a transmission ultrasonic wave by the object. Based on the ultrasonic wave, the processor 370 may, for example, calculate the distance to the object and the speed relative to the object.

The processor 370 may detect and track an object based on reflection infrared light which is formed as the result of reflection of transmission infrared light by the object. Based on the infrared light, the processor 370 may, for example, calculate the distance to the object and the speed relative to the object.

In some implementations, the object detection device 300 may include a plurality of processors 370 or may not include the processor 370. For example, each of the camera 310, the radar 320, the lidar 330, the ultrasonic sensor 340, and the infrared sensor 350 may include its own processor.

In a case where the object detection device 300 does not include the processor 370, the object detection device 300 may operate under control of the controller 170 or at least one processor inside the vehicle 100.

The object detection device 300 may operate under control of the controller 170.

The communication device 400 is configured to perform communication with an external device. Here, the external device may be a nearby vehicle, a mobile terminal, or a server.

To perform communication, the communication device 400 may include at least one selected from among a transmission antenna, a reception antenna, a Radio Frequency (RF) circuit capable of implementing various communication protocols, and an RF device.

The communication device 400 may include a short-range communication unit 410, a location information unit 420, a V2X communication unit 430, an optical communication unit 440, a broadcast transmission and reception unit 450, an Intelligent Transport Systems (ITS) communication unit 460, and one or more processors, such as processor 470.

In some implementations, the communication device 400 may further include other components in addition to the aforementioned components, or may not include some of the aforementioned components.

The short-range communication unit 410 is configured to perform short-range communication. The short-range communication unit 410 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication unit 410 may form wireless area networks to perform short-range communication between the vehicle 100 and at least one external device.

The location information unit 420 is configured to acquire location information of the vehicle 100. For example, the location information unit 420 may include a Global Positioning System (GPS) module or a Differential Global Positioning System (DGPS) module.

The V2X communication unit 430 is configured to perform wireless communication between a vehicle and a server (that is, vehicle to infra (V2I) communication), wireless communication between a vehicle and a nearby vehicle (that is, vehicle to vehicle (V2V) communication), or wireless communication between a vehicle and a pedestrian (that is, vehicle to pedestrian (V2P) communication).

The optical communication unit 440 is configured to perform communication with an external device through the medium of light. The optical communication unit 440 may include a light emitting unit, which converts an electrical signal into an optical signal and transmits the optical signal to the outside, and a light receiving unit which converts a received optical signal into an electrical signal.

In some implementations, the light emitting unit may be integrally formed with a lamp provided included in the vehicle 100.

The broadcast transmission and reception unit 450 is configured to receive a broadcast signal from an external broadcasting management server or transmit a broadcast signal to the broadcasting management server through a broadcasting channel. The broadcasting channel may include a satellite channel, and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information or data to the traffic system. The ITS communication unit 460 may receive information, data, or signals from the traffic system. For example, the ITS communication unit 460 may receive traffic information from the traffic system and provide the traffic information to the controller 170. In another example, the ITS communication unit 460 may receive a control signal from the traffic system, and provide the control signal to the controller 170 or one or more processors provided in the vehicle 100.

The processor 470 may control the overall operation of each unit of the communication device 400.

In some implementations, the communication device 400 may include a plurality of processors 470, or may not include the processor 470.

In a case where the communication device 400 does not include the processor 470, the communication device 400 may operate under control of the controller 170 or one or more processors of a device inside of the vehicle 100.

In some implementations, the communication device 400 may implement a vehicle display device, together with the user interface device 200. In this case, the vehicle display device may be referred to as a telematics device or an Audio Video Navigation (AVN) device.

The communication device 400 may operate under control of the controller 170.

The maneuvering device 500 is configured to receive a user input for driving the vehicle 100.

In the manual driving state, the vehicle 100 may operate based on a signal provided by the maneuvering device 500.

The maneuvering device 500 may include a steering input device 510, an acceleration input device 530, and a brake input device 570.

The steering input device 510 may receive a user input regarding the direction of travel of the vehicle 100. The steering input device 510 may take the form of a wheel to enable a steering input through the rotation thereof. In some implementations, the steering input device may be provided as a touchscreen, a touch pad, or a button.

The acceleration input device 530 may receive a user input for acceleration of the vehicle 100. The brake input device 570 may receive a user input for deceleration of the vehicle 100. Each of the acceleration input device 530 and the brake input device 570 may take the form of a pedal. In some implementations, the acceleration input device or the break input device may be configured as a touch screen, a touch pad, or a button.

The maneuvering device 500 may operate under control of the controller 170.

The vehicle drive device 600 is configured to electrically control the operation of various devices of the vehicle 100.

The vehicle drive device 600 may include a power train drive unit 610, a chassis drive unit 620, a door/window drive unit 630, a safety apparatus drive unit 640, a lamp drive unit 650, and an air conditioner drive unit 660.

In some implementations, the vehicle drive device 600 may further include other components in addition to the aforementioned components, or may not include some of the aforementioned components.

In some implementations, the vehicle drive device 600 may include one or more processors. For example, each unit of the vehicle drive device 600 may include its own processor(s).

The power train drive unit 610 may control the operation of a power train.

The power train drive unit 610 may include a power source drive unit 611 and a transmission drive unit 612.

The power source drive unit 611 may control a power source of the vehicle 100.

In the case in which a fossil fuel-based engine is the power source, the power source drive unit 611 may perform electronic control of the engine. As such the power source drive unit 611 may control, for example, the output torque of the engine. The power source drive unit 611 may adjust the output toque of the engine under control of the controller 170.

In a case where an electric motor is the power source, the power source drive unit 611 may control the motor. The power source drive unit 610 may control, for example, the RPM and toque of the motor under control of the controller 170.

The transmission drive unit 612 may control a transmission.

The transmission drive unit 612 may adjust the state of the transmission. The transmission drive unit 612 may adjust a state of the transmission to a drive (D), reverse (R), neutral (N), or park (P) state.

In some implementations, in a case where an engine is the power source, the transmission drive unit 612 may adjust a gear-engaged state to the drive position D.

The chassis drive unit 620 may control the operation of a chassis.

The chassis drive unit 620 may include a steering drive unit 621, a brake drive unit 622, and a suspension drive unit 623.

The steering drive unit 621 may perform electronic control of a steering apparatus provided inside the vehicle 100. The steering drive unit 621 may change the direction of travel of the vehicle 100.

The brake drive unit 622 may perform electronic control of a brake apparatus provided inside the vehicle 100. For example, the brake drive unit 622 may reduce the speed of the vehicle 100 by controlling the operation of a brake located at a wheel.

In some implementations, the brake drive unit 622 may control a plurality of brakes individually. The brake drive unit 622 may apply a different degree-braking force to each wheel.

The suspension drive unit 623 may perform electronic control of a suspension apparatus inside the vehicle 100. For example, when the road surface is uneven, the suspension drive unit 623 may control the suspension apparatus so as to reduce the vibration of the vehicle 100.

In some implementations, the suspension drive unit 623 may control a plurality of suspensions individually.

The door/window drive unit 630 may perform electronic control of a door apparatus or a window apparatus inside the vehicle 100.

The door/window drive unit 630 may include a door drive unit 631 and a window drive unit 632.

The door drive unit 631 may control the door apparatus. The door drive unit 631 may control opening or closing of a plurality of doors included in the vehicle 100. The door drive unit 631 may control opening or closing of a trunk or a tail gate. The door drive unit 631 may control opening or closing of a sunroof.

The window drive unit 632 may perform electronic control of the window apparatus. The window drive unit 632 may control opening or closing of a plurality of windows included in the vehicle 100.

The safety apparatus drive unit 640 may perform electronic control of various safety apparatuses provided inside the vehicle 100.

The safety apparatus drive unit 640 may include an airbag drive unit 641, a safety belt drive unit 642, and a pedestrian protection equipment drive unit 643.

The airbag drive unit 641 may perform electronic control of an airbag apparatus inside the vehicle 100. For example, upon detection of a dangerous situation, the airbag drive unit 641 may control an airbag to be deployed.

The safety belt drive unit 642 may perform electronic control of a seatbelt apparatus inside the vehicle 100. For example, upon detection of a dangerous situation, the safety belt drive unit 642 may control passengers to be fixed onto seats 110FL, 110FR, 110RL, and 110RR with safety belts.

The pedestrian protection equipment drive unit 643 may perform electronic control of a hood lift and a pedestrian airbag. For example, upon detection of a collision with a pedestrian, the pedestrian protection equipment drive unit 643 may control a hood lift and a pedestrian airbag to be deployed.

The lamp drive unit 650 may perform electronic control of various lamp apparatuses provided inside the vehicle 100.

The air conditioner drive unit 660 may perform electronic control of an air conditioner inside the vehicle 100. For example, when the inner temperature of the vehicle 100 is high, an air conditioner drive unit 660 may operate the air conditioner to supply cool air to the inside of the vehicle 100.

The vehicle drive device 600 may include one or more processors. For example, each unit of the vehicle drive device 600 may include its own processor(s).

The vehicle drive device 600 may operate under control of the controller 170.

The operation system 700 is a system for controlling the overall driving operation of the vehicle 100. The operation system 700 may operate in the autonomous driving state.

The operation system 700 may include the driving system 710, the vehicle pulling-out system 740, and the vehicle parking system 750.

In some implementations, the operation system 700 may further include other components in addition to the aforementioned components, or may not include some of the aforementioned component.

The operation system 700 may include one or more processors. For example, in some scenarios, each unit of the operation system 700 may include its own processor(s).

In some implementations, in a case where the operation system 700 is implemented as software, the operation system 700 may be a subordinate concept of the controller 170.

The operation system 700 may include at least one device selected from among the user interface device 200, the object detection device 300, the communication device 400, the vehicle drive device 600, and the controller 170.

The driving system 710 may perform driving of the vehicle 100.

The driving system 710 may perform driving of the vehicle 100 by providing a control signal to the vehicle drive device 600 in response to reception of navigation information from the navigation system 770.

The driving system 710 may perform driving of the vehicle 100 by providing a control signal to the vehicle drive device 600 in response to reception of object information from the object detection device 300.

The driving system 710 may perform driving of the vehicle 100 by providing a control signal to the vehicle drive device 600 in response to reception of a signal from an external device through the communication device 400.

The vehicle pulling-out system 740 may perform an operation of pulling the vehicle 100 out of a parking space.

The vehicle pulling-out system 740 may perform an operation of pulling the vehicle 100 out of a parking space, by providing a control signal to the vehicle drive device 600 in response to reception of navigation information from the navigation system 770.

The vehicle pulling-out system 740 may perform an operation of pulling the vehicle 100 out of a parking space, by providing a control signal to the vehicle drive device 600 in response to reception of object information from the object detection device 300.

The vehicle pulling-out system 740 may perform an operation of pulling the vehicle 100 out of a parking space, by providing a control signal to the vehicle drive device 600 in response to reception of a signal from an external device.

The vehicle parking system 750 may perform an operation of parking the vehicle 100 in a parking space.

The vehicle parking system 750 may perform an operation of parking the vehicle 100 in a parking space, by providing a control signal to the vehicle drive device 600 in response to reception of navigation information from the navigation system 770.

The vehicle parking system 750 may perform an operation of parking the vehicle 100 in a parking space, by providing a control signal to the vehicle drive device 600 in response to reception of object information from the object detection device 300.

The vehicle parking system 750 may perform an operation of parking the vehicle 100 in a parking space, by providing a control signal to the vehicle drive device 600 in response to reception of a signal from an external device.

The navigation system 770 may provide navigation information. The navigation information may include at least one selected from among map information, information on a set destination, information on a route to the set destination, information on various objects along the route, lane information, and information on a current location of the vehicle.

The navigation system 770 may include a memory and one or more processors. The memory may store navigation information. The processor(s) may control the operation of the navigation system 770.

In some implementations, the navigation system 770 may update pre-stored information by receiving information from an external device through the communication device 400.

In some implementations, the navigation system 770 may be classified as an element of the user interface device 200.

The sensing unit 120 may sense the state of the vehicle. The sensing unit 120 may include an attitude sensor (for example, a yaw sensor, a roll sensor, or a pitch sensor), a collision sensor, a wheel sensor, a speed sensor, a gradient sensor, a weight sensor, a heading sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The sensing unit 120 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, ambient illumination information, information about the pressure applied to an accelerator pedal, and information about the pressure applied to a brake pedal.

The sensing unit 120 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The interface 130 may be any suitable interface for various kinds of external devices that are connected to the vehicle 100. For example, the interface 130 may have a port that is connectable to a mobile terminal and may be connected to the mobile terminal via the port. In this case, the interface 130 may exchange data with the mobile terminal.

In some implementations, the interface 130 may provide a passage for the supply of electrical energy to a mobile terminal connected thereto. When the mobile terminal is electrically connected to the interface 130, the interface 130 may provide electrical energy, supplied from the power supply unit 190, to the mobile terminal under control of the controller 170.

The memory 140 is electrically connected to the controller 170. The memory 140 may store basic data for each unit, control data for the operational control of each unit, and input/output data. The memory 140 may be any of various hardware storage devices, such as a ROM, a RAM, an EPROM, a flash drive, and a hard drive. The memory 140 may store various data for the overall operation of the vehicle 100, such as programs for the processing or control of the controller 170.

In some implementations, the memory 140 may be integrally formed with the controller 170, or may be provided as an element of the controller 170.

The controller 170 may control the overall operation of each unit inside the vehicle 100. The controller 170 may be referred to as an Electronic Controller (ECU).

The power supply unit 190 may supply power required to operate each component under control of the controller 170. In particular, the power supply unit 190 may receive power from, for example, a battery inside the vehicle 100.

The lamp 800 may be controlled by the lamp drive unit 650. The lamp 800 may include a lamp for providing visibility (e.g., a headlamp) and a lamp for providing a signal (e.g., a brake lamp and a turn signal lamp). The lamp 800 may include a headlamp, a tail lamp, a brake lamp, a backup lamp, a turn signal lamp, a fog lamp, etc.

The lamp 800 is described in more detail in conjunction with the following drawings.

At least one processor and the controller 170 included in the vehicle 100 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The following description relates to operation of the lamp when the vehicle 100 is travelling at night, but implementations are also applicable to the case of driving during the day. In some implementations, the distinction between day and night may be determined based on intensity of illumination around a vehicle sensed by the sensing unit 125. For example, if sensed intensity of illumination is equal to or less than first reference intensity of illumination, it is determined to be night time, whereas if the sensed intensity of illumination is greater than second reference intensity of illumination, it is determined to be day time.

Figure 8:
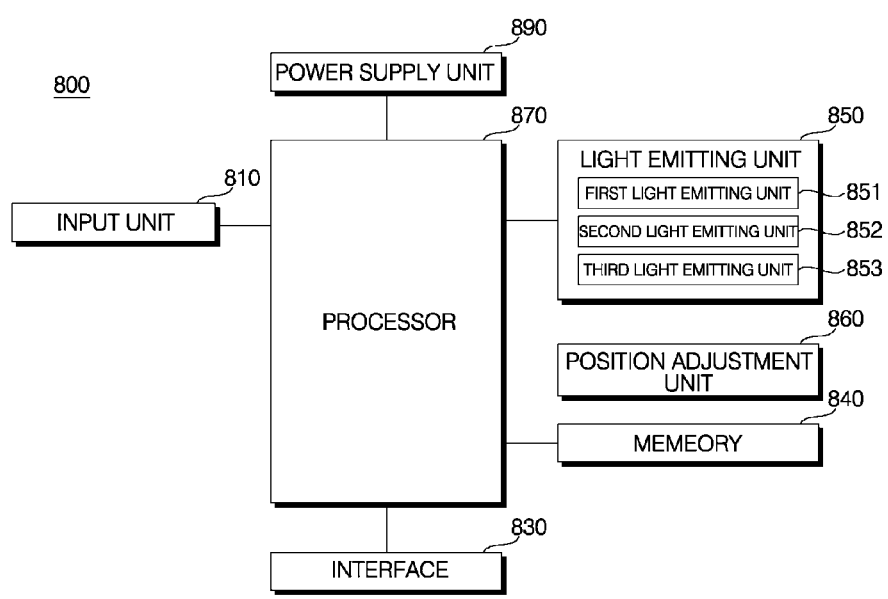
FIG. 8 is a block diagram illustrating an example of a lamp according to some implementations.

FIG. 8 is a block diagram illustrating a lamp according to some implementations.

Referring to FIG. 8, the lamp 800 may include an input unit 810, an interface 830, a memory 840, a light emitting unit 850, a position adjustment unit 860, at least one processor such as processor 870, and a power supply unit 890.

The input unit 810 may receive a user input to control the lamp 800. The input unit 810 may be integrally formed with the input unit 210 of the user interface device 200.

The input unit 810 may receive a user input, such as a voice input, a gesture input, a touch input, and a mechanical input.

The processor 870 may control the light emitting unit 850 based on the user input received via the input unit 810.

The interface 830 may exchange information, data, or a signal with a difference device or system included in the vehicle 100.

Specifically, the interface 830 may exchange information, data, or a signal with at least one device or system of the following: the user interface device 200, the object detection device 300, the communication device 400, the maneuvering device 500, the vehicle drive device 600, the operation system 700, the navigation system 770, the sensing unit 120, the memory 140, and the controller 170.

The interface 830 may receive driving situation information from at least one of the object detection device 300, the communication device 400, and the navigation system 770.

The driving situation information may include information on an object in the vicinity of the autonomous vehicle 100, information on a road on which the autonomous vehicle 100 is now travelling, ambient illumination information, navigation information, and information on an object detection sensor being used in an autonomous driving state.

For example, the interface 830 may receive object information from the object detection device 300 or the communication device 400.

The object information may include information on a nearby vehicle travelling in the vicinity of the autonomous vehicle 100.

The information on a nearby vehicle may include information indicating whether the nearby vehicle is a manually driven vehicle.

The object information may include information on at least one of a nearby vehicle, a two-wheeled vehicle, and a pedestrian located within a predetermined distance from the autonomous vehicle 100.

The object information may include information on at least one of a pedestrian, a two-wheeled vehicle, and a traffic sign plate.

For example, the interface 830 may receive, from the object detection device 300 or the communication device 400, information on a road on which the autonomous vehicle 100 is travelling.

The information on a road on which the autonomous vehicle 100 is travelling may include information on an autonomous vehicle-only road.

For example, the interface 830 may receive the ambient illumination information from the sensing unit 120.

The interface 830 may receive the navigation information from the navigation system 770.

For example, the interface 830 may receive information on a route of an autonomous vehicle 100 from the navigation system 770.

The interface 830 may receive, from the object detection device 300, information on an object detection sensor being used in an autonomous driving state.

For example, in an autonomous driving state, the interface 830 may receive information on a usage state of at least one of the camera 310, the radar 320, the lidar 330, the ultrasonic sensor 340, and the infrared sensor 350 from the object detection device 300.

The memory 840 is electrically connected to the controller 170. The memory 140 may store basic data for each unit, control data for the operational control of each unit, and input/output data. The memory 840 may be any of various hardware storage devices, such as a ROM, a RAM, an EPROM, a flash drive, and a hard drive. The memory 840 may store various data for the overall operation of the lamp 800, such as programs for the processing or control of the processor 870.

The light emitting unit 850 may emit a light into a space outside the autonomous vehicle 100. To this end, the light emitting unit 850 may include a light source. The light source may include a device capable of converting electricity energy into light energy. For example, the light source may include at least one of the following: a Light Emitting Diode (LED), a light emitting device of a laser diode, a metal filament lamp, a halogen bulb, a High Intensity Discharge (HID) lamp, and a neon gas discharge lamp.

The light emitting unit 850 may include a first light emitting unit 851, a second light emitting unit 852, a third light emitting unit 853.

The first light emitting unit 851 may emit light to implement a headlamp.

The second light emitting unit 852 may emit a light s to implement rear combination lamps.

Using a light, the third light emitting unit 853 may project an image onto a space outside the autonomous vehicle 100. The image may be displayed in the form that can be recognized by an occupant of the autonomous vehicle 100, an occupant of a nearby vehicle in the vicinity of the autonomous vehicle 100, or a pedestrian.

The third light emitting unit 853 may emit a light of a predetermined range toward an object. The light may be a visible light emitted toward an object to allow a person to recognize the object.

The position adjustment unit 860 may adjust the position of a light source included in the light emitting unit 850.

The position adjustment unit 860 may include a drive unit and a driving force transfer unit. The drive unit may include any one of a motor capable of generating a driving force, an actuator, and a solenoid. The driving force transfer unit includes at least one gear to transfer a driving force generated by the drive unit to a light source.

Under control of the processor 870, the position adjustment unit 860 may be provided with a driving force from the drive unit to control the position of a light source.

The processor 870 may control the overall operation of each unit of the lamp 800.

The processor 870 may receive, for example via the interface 830, driving state information of the autonomous vehicle 100. For example, the processor 870 may receive information as to whether the autonomous vehicle 100 is in an autonomous driving state, whether the autonomous vehicle 100 is in a manual driving state, whether the autonomous driving state is transitioned to a manual driving state, or whether the manual driving state is transitioned to the autonomous driving state.

The processor 870 may control the light emitting unit 850 based on a driving state of the autonomous vehicle 100. For example, the processor 870 may control the light emitting unit 850 based on whether the autonomous vehicle 100 is in an autonomous driving state or a manual driving state.

If the autonomous vehicle 100 is operating in the manual driving state, then the processor 870 may control the light emitting unit 850 to emit a light into a space outside the autonomous vehicle 100.

For example, if the autonomous vehicle 100 is operating in the manual driving state, then a visibility providing lamp included in the lamp 800 may be operated in a similar manner as a manually driven vehicle. In some scenarios, if the autonomous vehicle 100 is operating in the manual driving state, the processor 870 may control the first light emitting unit 851 to emit a light (e.g., a headlamp) toward a space forward of the autonomous vehicle 100.

As another example, if the autonomous vehicle 100 is operating in the manual driving state, then a lamp for providing a signal, which is included in the lamp 800, may be controlled based on information regarding one or more objects nearby the autonomous vehicle 100.

In some scenarios, if an object, such as a nearby vehicle, a two-wheeled vehicle, or a pedestrian, is not located in the vicinity of the autonomous vehicle 100, then the processor 870 may control the second light emitting unit 852 (e.g., a tail lamp and a brake lamp) to not emit light toward a space rearward of the autonomous vehicle 100. In such scenarios, energy may be conserved while not risking safety.

If another autonomous vehicle operating in an autonomous driving state is located at the vicinity of the autonomous vehicle 100, then the processor 870 may control the second light source 852 to emit a light (e.g., a tail lamp and a brake lamp) toward a space rearward of the autonomous vehicle 100. In such scenarios, activating the lamp may help improve safety.

If an object, such as a nearby vehicle travelling in a manual driving state, a two-wheeled vehicle, or a pedestrian, is located at the vicinity of the autonomous vehicle 100, then the processor 870 may control the second light emitting unit 852 to emit a light (e.g., a tail lamp and a brake lamp) toward a space rearward of the autonomous vehicle 100. In such scenarios as well, activating the lamp may help improve safety.

In some implementations, the processor 870 may control one or more light emitting units based on a state in which the autonomous vehicle 100 transitions between manual and autonomous driving states.

For example, if the autonomous vehicle 100 is transitioned from the manual driving state to the autonomous driving state, then the processor 870 may control the light emitting unit 850 to not emit a light into a space outside the autonomous vehicle.

As a specific example, if the autonomous vehicle 100 is transitioned from the manual driving state to the autonomous driving state, then the processor 870 may control the first light emitting unit 851 to not emit a light (e.g., a headlamp) toward a space forward of the autonomous vehicle 100. In such scenarios, energy may be conserved.

As another specific example, if the autonomous vehicle 100 is transitioned from the manual driving state to the autonomous driving state, then the processor 870 may control the second light emitting unit 852 to not emit a light (e.g., a tail lamp and a brake lamp) toward a space rearward of the autonomous vehicle 100. In such scenarios, energy may be conserved.

As another example, if an object, such as a nearby vehicle, a two-wheeled, or a pedestrian, is detected in the vicinity of the autonomous vehicle 100 in a state in which the autonomous vehicle 100 is transitioned from the manual driving state to the autonomous driving state, then the processor 870 may control the first light emitting unit 851 to emit a light toward a space forward of the autonomous vehicle 100 or may control the second light emitting unit 852 to emit a light toward a space rearward of the autonomous vehicle 100. In such scenarios, activating the lamp may help improve safety.

As such, selective control of one or more lamps of the vehicle based on the vehicle's situation may help reduce power consumption of the lamp 800, thereby increasing energy efficiency, while maintaining proper driving safety. In addition, the energy that is saved accordingly may be utilized for other operations, such as driving.

As yet another example, if the autonomous vehicle 100 is transitioned from the autonomous driving state to the manual driving state, the processor 870 may control the light emitting unit 850 to emit a light into a space outside the autonomous vehicle 100. In this manner, the vehicle may adaptively operate the lamp 800 based on the state of the vehicle, thereby preventing unnecessary energy consumption.

In the foregoing implementations, the state in which a transition between the manual driving state and autonomous driving state occurs is not limited to any specific time period. For example, the processor 870 may control light emitting units in the state in which a transition occurs by controlling the light emitting units based on detecting that the transition has occurred or will occur.

The processor 870 may control a vehicle lamps based on information regarding the vehicle that is received or obtained from various types of information sources. For example, the processor 870 may receive driving situation information via the interface 830, and may control the light emitting unit 850 based on the received driving situation information.

In some implementations, the driving situation information may include at least one of the following: information on an object in the vicinity of the autonomous vehicle 100, information on a road on which the autonomous vehicle 100 is travelling, ambient illumination information, navigation information, or information on an object detection sensor being used in an autonomous driving state.

The processor 870 may receive object information, for example, from the object detection device 300 or the communication device 400 via the interface 830.

The object information may include information on a nearby vehicle travelling in the vicinity of the autonomous vehicle 100.

In some implementations, if the autonomous vehicle 100 is operating in the autonomous driving state, then the processor 870 may control the light emitting unit 850 based on information on a nearby vehicle travelling in the vicinity of the autonomous vehicle 100.

If a nearby vehicle is determined to be a manually driven vehicle when the autonomous vehicle 100 is operating in the autonomous driving state, then the processor 870 may control the light emitting unit 850 to emit a light into a space outside the autonomous vehicle 100.

For example, if information on a nearby vehicle travelling in the vicinity is received when the autonomous vehicle 100 is operating in the autonomous driving state, then the processor 870 may control the first light emitting unit 851 to emit light (e.g., a headlamp) toward a space forward of the autonomous vehicle 100.

As another example, if information on a manually driven vehicle travelling in the vicinity is received when the autonomous vehicle 100 is operating in the autonomous driving state, the processor 870 may control the second light emitting unit 852 to emit a light (e.g., a tail lamp and a brake lamp) toward a space rearward of the autonomous vehicle 100.

In this manner, the vehicle may help a driver of a nearby manually driven vehicle to recognize at night that an autonomous vehicle is travelling in the vicinity, thereby helping to prevent an accident.

In some implementations, the processor 870 may control the light emitting unit 850 based on information on a distance between the autonomous vehicle 100 and a nearby vehicle in the vicinity of the autonomous vehicle 100.

The processor 870 may receive the information on a distance between the autonomous vehicle 100 and a nearby vehicle in the vicinity of the autonomous vehicle 100. Such information may be received, for example, from the object detection device 300 via the interface 830.

As an example, if the distance between the autonomous vehicle 100 and a nearby vehicle is greater than a reference distance, then the processor 870 may control the light emitting unit to not emit a light into a space outside the autonomous vehicle 100.

As another example, if the distance between the autonomous vehicle 100 and a nearby vehicle is equal to or smaller than the reference distance, the processor 870 may control the light emitting unit 850 to emit a light into a space outside the autonomous vehicle 100.

In some implementations, the processor 870 may use the interface 830 to control the light emitting unit 850 based on information on time to collision (TTC) between the autonomous vehicle 100 and the nearby vehicle.

The processor 870 may receive the TTC information regarding the autonomous vehicle 100 and the nearby vehicle, for example, from the object detection device 300 via the interface 830.

As an example, if the TTC between the autonomous vehicle 100 and the nearby vehicle is greater than a reference value, then the processor 870 may control the light emitting unit 850 to not emit a light into a space outside the autonomous vehicle 100.

As another example, if the TTC between the autonomous vehicle 100 and the nearby vehicle is equal to or smaller than the reference value, then the processor 870 may control the light emitting unit 850 to not emit a light into a space outside the autonomous vehicle 100.

If object information is acquired, the processor 870 may control the light emitting unit 850 to emit a light into a space outside the autonomous vehicle 100. The object information may include, for example, information on at least one of a nearby vehicle, a two-wheeled vehicle, or a pedestrian that are within a predetermined distance from the autonomous vehicle 100.

As an example, if object information is acquired when the autonomous vehicle 100 is operating in an autonomous driving state, then the processor 870 may control a first light emitting unit 851 to emit a light (e.g., a headlamp) toward a space forward of the autonomous vehicle 100.

As another example, if object information is acquired when the autonomous vehicle 100 is operating in an autonomous driving state, then the processor 870 may control a second light emitting unit 852 to emit a light (e.g., a tail lamp and a brake lamp) toward a space rearward of the autonomous vehicle 100.

In this manner, adaptive control of one or more lamps may allow a nearby vehicle, a two-wheeled vehicle, and/or a pedestrian to recognize that an autonomous vehicle is travelling in the vicinity at night, thereby helping to prevent an accident.

In some implementations, the processor 870 may receive route information of the autonomous vehicle 100. Such information may be received, for example, via the interface 830. The processor 870 may control the light emitting unit 850 to display a visual image, corresponding to the route information, in a space outside the autonomous vehicle 100 in a direction toward an object.

For example, the processor 870 may control a third light emitting unit 853 to display a visual image, corresponding to route information of the autonomous vehicle 100, in a direction toward an object. The visual image may be an image indicating routing information, such as a directional indicator in the form of an arrow or the like.

In this manner, adaptive control of one or more lamps may help inform a nearby vehicle, a two-wheeled vehicle, or a pedestrian of the route of the autonomous vehicle 100 in the vicinity, thereby preventing collision with the nearby vehicle, the two-wheeled vehicle, or the pedestrian.

In some implementations, the processor 870 may receive, for example via the interface 830, information regarding a road on which the autonomous vehicle 100 is travelling. For example, the information regarding the road on which the autonomous vehicle 100 is travelling may indicate whether the road is restricted for use only be autonomous vehicles.

For example, the information regarding the road may indicate that the road is an autonomous vehicle-only road, on which only autonomous vehicles are allowed to travel and manually driven vehicles are prohibited. In this case, the autonomous vehicle 100 may determine that any nearby vehicle is another autonomous vehicle, and thus the autonomous vehicle 100 may determine that it is not necessary to provide the nearby vehicle with visual recognition of the presence of the autonomous vehicle 100. In such a case, a light is controlled to be not emitted from the autonomous vehicle 100, helping maximize energy efficiency.

As such, if the autonomous vehicle 100 is travelling on an autonomous vehicle-only road, then the processor 870 may control the light emitting unit 850 to not emit a light into a space outside the autonomous vehicle 100.

In some implementations, the processor 870 may receive ambient illumination information, for example via the interface 830. The ambient illumination information may indicate a suitable measure of illumination outside the vehicle 100. The processor 870 may control the light emitting unit 850 based on ambient illumination information to change an amount of light to emit into a space outside the autonomous vehicle 100.

As an example, if the sensing unit 125 senses ambient illumination equal to or greater than a reference illumination level, then the processor 870 may control the light emitting unit 850 to reduce an amount of light to be emitted toward a space forward of the autonomous vehicle 100.

As another example, if the sensing unit 125 senses ambient illumination equal to or less than the reference illumination level, the processor 870 may control the light emitting unit 850 to increase an amount of light to be emitted toward a space forward of the autonomous vehicle 100.

In some implementations, the processor 870 may receive, for example via the interface 830, information regarding an object detection sensor being used in the autonomous driving state. The processor 870 may control the light emitting unit 850 based on the information on an object detection sensor.

As an example, if the camera 310 is used as an object detection sensor, then the processor 870 may control the light emitting unit 850 to emit a light into a space outside the autonomous vehicle 100.

As another example, if the camera 310 is not used as an object detection sensor, then the processor 870 may control the light emitting unit 850 to not emit a light into a space outside the autonomous vehicle 100.

If the camera 310 is used even when the autonomous vehicle 100 is operating in the autonomous driving state, then the vehicle 100 may emit a light to an area of which an image is acquired. If the camera 310 is not used when the autonomous vehicle 100 is travelling in the autonomous driving state, then the vehicle 100 may determine not to emit light to an area of which an image is acquired.

As such, the vehicle 100 may determine whether to emit a light based on whether the camera 310 is used in the autonomous driving state, and therefore, the vehicle 100 may control the lamp 800 in consideration of energy efficiency.

In some implementations, based on a type of an object detection sensor in use, the processor 870 may control an amount of light to be emitted.

As an example, if the object detection sensor in use is the camera 310, then the processor 870 may control the light emitting unit 850 to emit a first-level amount of light.

As another example, if the object detection sensor in use is the lidar 330, then the processor 870 may control the light emitting unit 850 to emit a second-level amount of light.

As yet another example, if the object detection sensor in use is the infrared sensor 350, then the processor 870 may control the light emitting unit 850 to emit a third-level amount of light.

In some scenarios, different sensors may be configured to detect a different amount of light. By controlling an amount of light to be emitted from the lamp 800 according to a sensor that is in use, the vehicle 100 may improve the accuracy of detecting an object.

In some implementations, the processor 870 may receive, for example via the interface 830, information regarding at least one of a pedestrian, a two-wheeled vehicle, or a traffic sign plate. The processor 870 may control the light emitting unit 850 to emit a light of a predetermined range toward at least one of the pedestrian, the two-wheeled, and the traffic sign plate.

As an example, the processor 870 may control the third light emitting unit 853 to emit a light toward at least one of the pedestrian, the two-wheeled vehicle, or the traffic sign plate for recognition purposes In some implementations, the autonomous vehicle 100 may detect a plurality of nearby vehicles that are travelling with the vehicle 100 in a group, and may adaptively control one or more lamps accordingly.

For example, the processor 870 may control the light emitting unit 850 based on a position of the autonomous vehicle 100 in the group.

When the autonomous vehicle 100 is travelling in a group with a plurality of nearby vehicles, the processor 870 may receive information regarding a position of the autonomous vehicle 100 in the group. Such information may be received, for example, from the object detection device 300 or the communication device 400 via the interface 830.

In some implementations, the driving situation information may further include a position of the autonomous vehicle 100 in the group.

As an example, if the autonomous vehicle 100 is a lead vehicle in the group, then the processor 870 may control the first light emitting unit 851 to emit a light toward a space forward of the autonomous vehicle 100. That is, the processor 870 may drive a headlamp of the autonomous vehicle 100.

As another example, if the autonomous vehicle 100 is the last following vehicle in the group, then the processor 870 may control the second light emitting unit 852 to emit a light toward a space rearward of the autonomous vehicle 100. For example, the processor 870 may drive rear combination lamps of the autonomous vehicle 100 to operate a tail lamp or a brake lamp.

As yet another example, if the autonomous vehicle 100 is neither the lead vehicle nor the last following vehicle in the group, then the processor 870 may control the light emitting unit 850 to not emit a light into a space outside the autonomous vehicle 100.

As such, the autonomous vehicle 100 may adaptively control one or more lamps based on a relative position of the vehicle 100 amongst a plurality of nearby travelling vehicles. When the plurality of vehicles is travelling in a group, then only the leading vehicle and the last following vehicle may activate one or more lamps, for example to give notification about the group to another nearby vehicle, a two-wheeled vehicle, or a pedestrian. On the other hand, a vehicle travelling in the middle of the group may reduce or not activate a lamp, and thus may prevent unnecessary energy consumption.

Under control of the processor 870, the power supply unit 890 may provide power required to operate each component. For example, the power supply unit 890 may be provided with power from a battery inside the vehicle.

Figure 9:
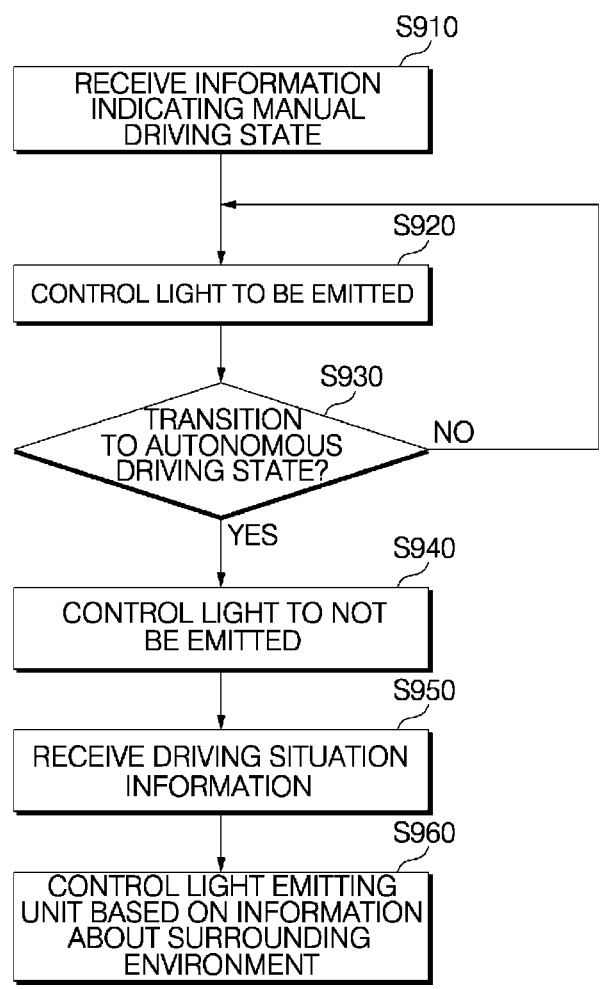
FIGS. 9 and 10 are flowcharts illustrating an example of an operation of a lamp according to some implementations.
Figure 10:
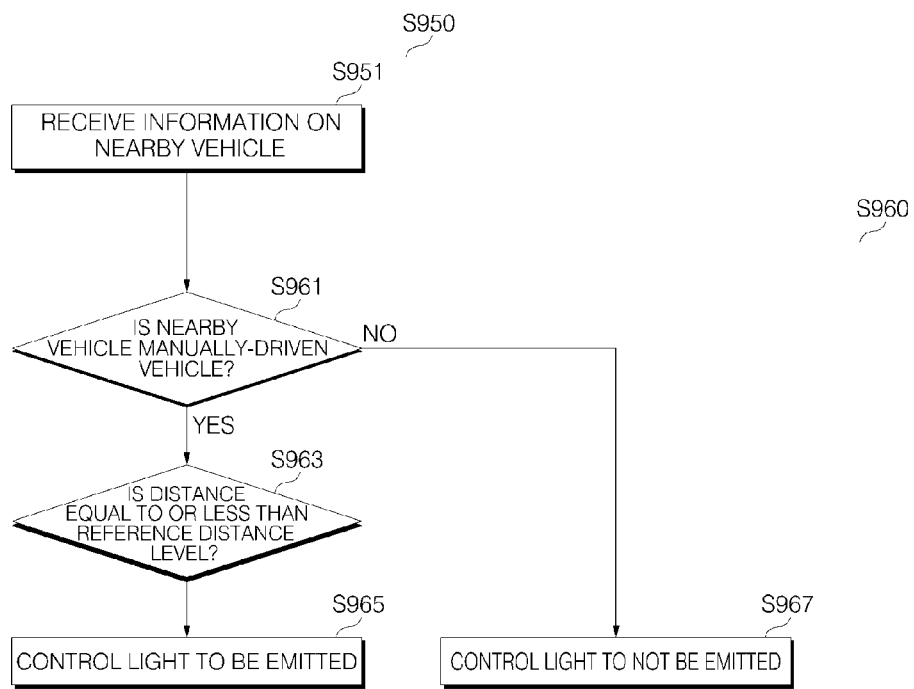

FIGS. 9 and 10 are flowcharts illustrating operation of a lamp according to some implementations.

Referring to FIG. 9, the processor 870 may receive information about a manual driving state of the autonomous vehicle 100 from the user interface device 200 or from the controller 170 via the interface 830 in S910.

If information indicating a manual driving mode is received, the processor 870 may control the light emitting unit 850 to emit a light into a space outside the autonomous vehicle 100 in S920.

When the autonomous vehicle 100 is operating in a manual driving state, the processor 870 may control the light emitting unit 850 to emit a light into a space outside the autonomous vehicle 100. The light emitted to the outside may include light emitted by the first light emitting unit 851 toward a space forward of the autonomous vehicle 100, and light emitted by the second light emitting unit 852 toward a space rearward of the autonomous vehicle 100.

The processor 870 may determine whether driving state transition information, indicating that the autonomous vehicle 100 is transitioned from the manual driving state to an autonomous driving state, is received via the interface 830 in S930.

If the autonomous vehicle 100 is transitioned from the manual driving state to the autonomous driving state, the processor 870 may control the light emitting unit 850 to not emit a light into a space outside the autonomous vehicle 100 in S940.

Then, the processor 870 may receive driving situation information via the interface 830 in S950.

The driving situation information may include at least one of the following: information on an object in the vicinity of the autonomous vehicle 100, information of a road on which the autonomous vehicle 100 is travelling, ambient illumination information, navigation information, and information on an object detection sensor being used in the autonomous driving state.

The object information may include information on a nearby vehicle travelling in the vicinity of the autonomous vehicle 100.

The information on the nearby vehicle may include information as to whether the nearby vehicle is a manually driven vehicle.

The object information may include information on at least one of a nearby vehicle, a two-wheeled vehicle, and a pedestrian located within a predetermined distance from the autonomous vehicle 100.

The object information may include information on at least one of a pedestrian, a two-wheeled vehicle, and a traffic sign plate.

The information on a road on which the autonomous vehicle 100 is travelling may include information on an autonomous vehicle-only road.

The navigation information may include route information of the autonomous vehicle 100.

In some implementations, if the autonomous vehicle 100 is travelling in a group with a plurality of nearby vehicles, the driving situation information may further include information on a position of the autonomous vehicle 100 in the group.

The processor 870 may control the light emitting unit 850 based on the received driving situation information in S960.

If object information is acquired, the processor 870 may control the light emitting unit 850 to emit a light into a space outside the autonomous vehicle 100. The object information may include information on at least one of a nearby vehicle, a two-wheeled vehicle, and a pedestrian located within a predetermined distance from the autonomous vehicle 100.

The processor 870 may control the light emitting unit 850 to display a visual image, corresponding to route information in a space outside the autonomous vehicle 100, in a direction toward an object.

If the autonomous vehicle 100 is travelling on an autonomous vehicle-only road, the processor 870 may control the light emitting unit 850 to not emit a light into a space outside the autonomous vehicle 100.

The processor 870 may control the light emitting unit 850 based on ambient illumination to change an amount of light to be emitted into a space outside the autonomous vehicle.

The processor 870 may control the light emitting unit 850 based on information on an object detection sensor.

If the camera 310 is used as an object detection sensor, the processor 870 may control the light emitting unit 850 to emit a light into a space outside the autonomous vehicle 100. If the camera 310 is not used as an object detection sensor, the processor 870 may control the light emitting unit 850 to not emit a light into a space outside the autonomous vehicle 100.

The processor 870 may control the light emitting unit 850 to emit a light of a predetermined range to at least one of a pedestrian, a two-wheeled vehicle, and a traffic sign plate.

If the autonomous vehicle 100 is a lead vehicle in a group, the processor 870 may control the first light emitting unit 851 to emit a light toward a space forward of the autonomous vehicle 100.

If the autonomous vehicle 100 is the last following vehicle in the group, the processor 870 may control the second light emitting unit 852 to emit a light toward a space rearward of the autonomous vehicle 100.

If the autonomous vehicle is neither the lead vehicle nor the last following vehicle in the group, the processor 870 may control the light emitting unit 850 to not emit a light into a space outside of the vehicle 100.

FIG. 10 is a flowchart illustrating operation of controlling a lamp based on information on a nearby vehicle according to some implementations.

Referring to FIG. 10, the processor 870 may receive information on a nearby vehicle from the object detection device 300 via the interface 830 in S951.

In some implementations, operation S951 may be included in operation S950 shown in FIG. 9.

If the autonomous vehicle 100 is operating in an autonomous driving state, the processor 870 may control the light emitting unit 850 based on information on a nearby vehicle travelling in the vicinity of the autonomous vehicle 100.

If the nearby vehicle is a manually driven vehicle and a distance between the autonomous vehicle 100 and the nearby vehicle is equal to or less than a reference distance level, the processor 870 may control the light emitting unit 850 to emit a light into a space outside the autonomous vehicle 100 in S961, S963, and S965.

If the nearby vehicle is an autonomous vehicle, the processor 870 may control the light emitting unit 850 to not emit a light into a space outside the autonomous vehicle 100 in S967.

If the distance between the autonomous vehicle 100 and the nearby vehicle is greater than the reference distance level, the processor 870 may control the light emitting unit 850 to not emit a light into a space outside the autonomous vehicle 100 S967.

In some implementations, operations S961, S963, S965, and S967 may be included in operation S960 shown in FIG. 9.

Figure 11:
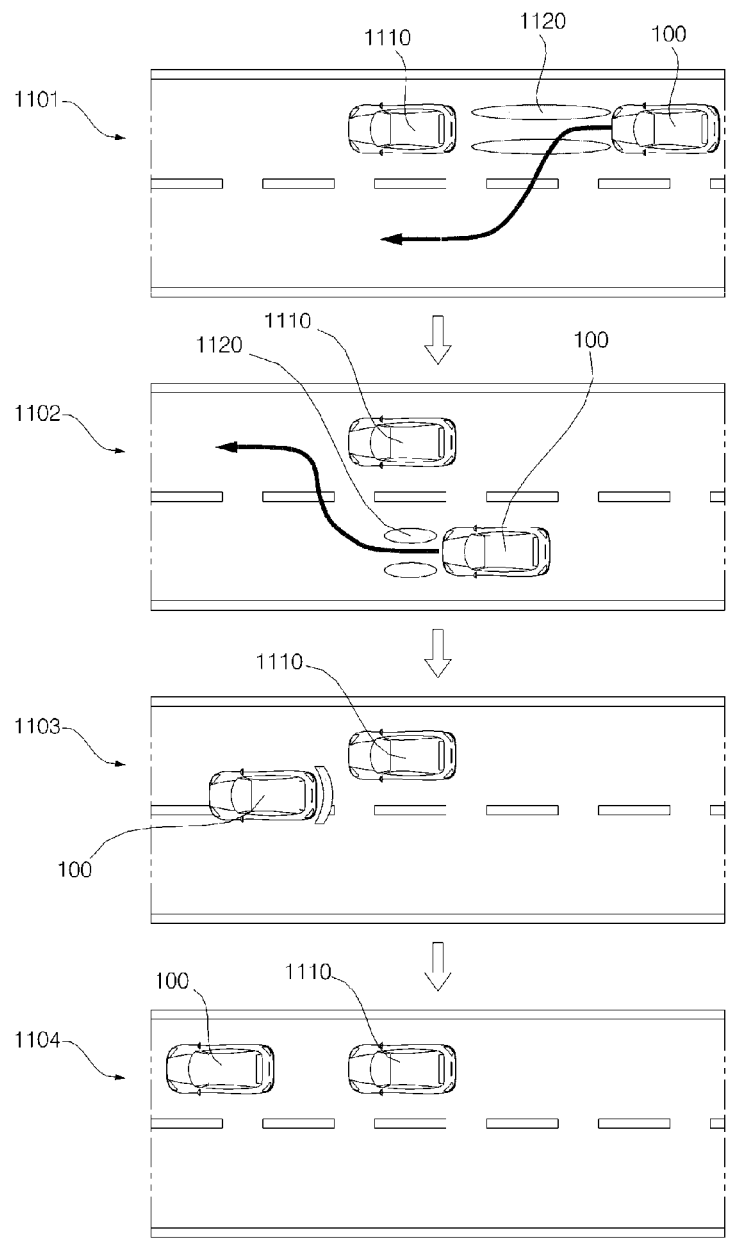
FIGS. 11 to 13 are diagrams illustrating examples of operations of a lamp based on information regarding a nearby vehicle according to some implementations.
Figure 12:
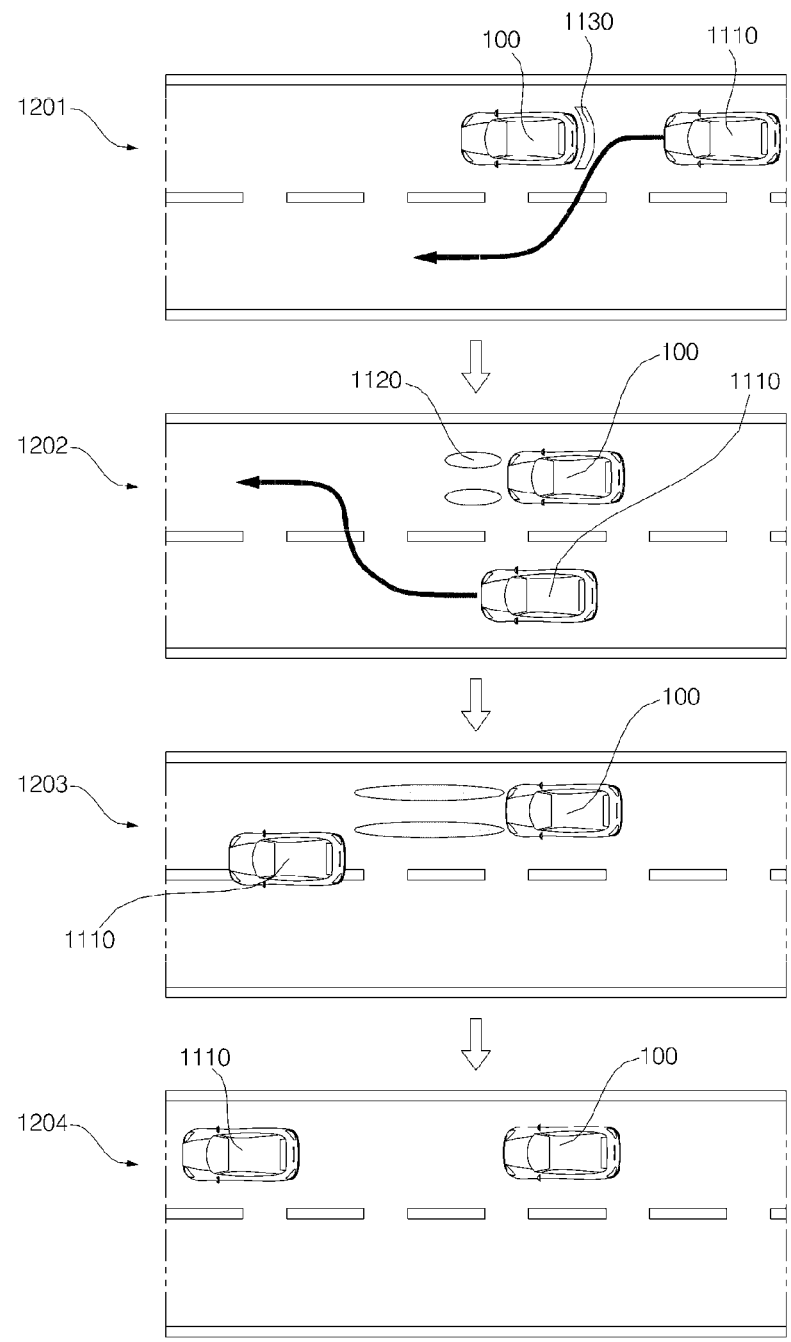
Figure 13:
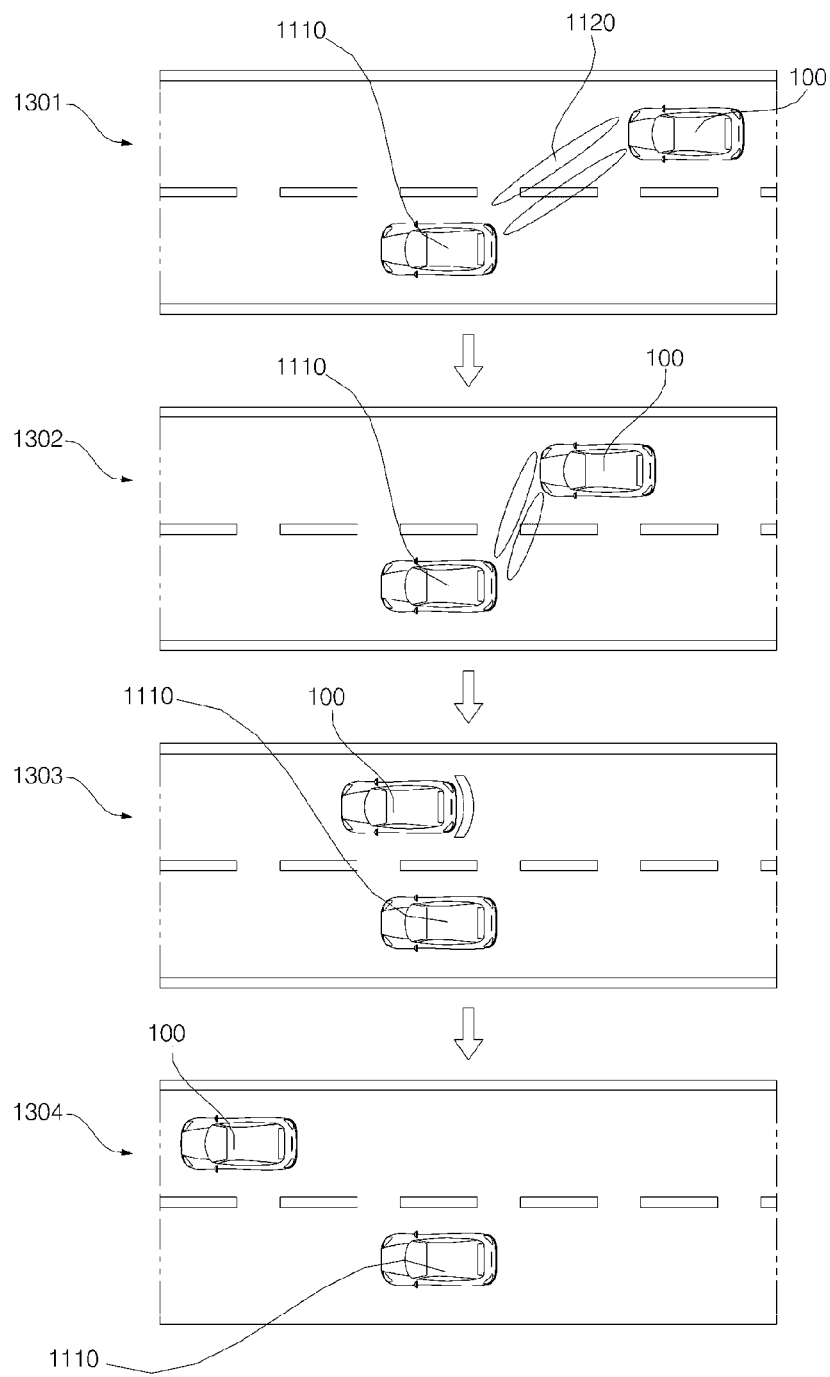

FIGS. 11 to 13 are views illustrating operation of a lamp based on information on a nearby vehicle according to some implementations.

In FIGS. 11 to 13, the autonomous vehicle 100 may be operating in an autonomous driving state.

In FIGS. 11 to 13, a nearby vehicle 1110 may be a manually driven vehicle. Alternatively, the nearby vehicle 1110 may be an autonomous vehicle operating in a manual driving state.

Information as to whether the nearby vehicle 1110 is a manually driven vehicle or an autonomous vehicle operating in the manual driving state may be acquired from the communication device 400 which communicates with the nearby vehicle 1110.

Referring to FIG. 11, the nearby vehicle 1110 is travelling on the same lane with the autonomous vehicle 100, and may be ahead of the autonomous vehicle 100.

As shown in the example indicated by 1101, the autonomous vehicle 100 may approach the nearby vehicle 1110 from behind. If a distance between the autonomous vehicle 100 and the nearby vehicle 1110 is equal to or smaller than a reference distance level, the processor 870 may control the first light emitting unit 851 to emit a light 1120 toward a space forward of the autonomous vehicle 100. The light 1120 may be a light provided from a headlamp.

Then, as shown in the example indicated by 1102, the autonomous vehicle 100 may change a lane to travel in parallel with the nearby vehicle 1110. In this case, based on a distance between the autonomous vehicle 100 and the nearby vehicle 1110, the processor 870 may change an area to which the light 1120 is projected in the space forward of the autonomous vehicle 100.

For example, the processor 870 may gradually reduce the length of travel of the light 1120 as the autonomous vehicle 100 more closely approaches the nearby vehicle 1110 and the distance between the two vehicles becomes shorter. The length of travel of the light 1120 may be in the direction of travel of the autonomous vehicle 100.

As such, the processor 870 may control the light 1120 to be emitted merely sufficient to allow a driver of the nearby vehicle 1110 to recognize a location of the autonomous vehicle 100.

Then, as shown in the example indicated by 1103, the autonomous vehicle 100 may change a lane again to overtake the nearby vehicle 1110. In this case, the processor 870 may control the second light emitting unit 852 to emit a light 1130 toward a space rearward of the autonomous vehicle 100. The light 1130 may be a light provided from the rear combination lamps (e.g., a tail lamp).

Then, the autonomous vehicle 100 accelerates and therefore the distance between the autonomous vehicle 100 and the nearby vehicle 1110 may become greater than the reference distance level, as shown in the example indicated by 1104. In this case, the processor 870 may control the light emitting unit 850 to not emit a light into a space outside the autonomous vehicle 100.

Referring to FIG. 12, the nearby vehicle 1110 may be located behind the autonomous vehicle 100.

As shown in the example indicated by 1201, the nearby vehicle 1110 may approach the autonomous vehicle 100 from behind. When a distance between the autonomous vehicle 100 and the nearby vehicle 1110 is equal to or less than a reference distance level, the processor 870 may control the second light emitting unit 852 to emit a light 1130 toward a space rearward of the autonomous vehicle 100. The light 1130 may be a light provided from the rear combination lamps (e.g., a tail lamp).

Then, as shown in the example indicated by 1202, the nearby vehicle 1110 may change a lane to travel in parallel with the autonomous vehicle 100. In this case, based on the distance between the autonomous vehicle 100 and the nearby vehicle 1110, the processor 870 may control the first light emitting unit 851 to emit a light 1120 toward a space forward of the autonomous vehicle 100. The light 1120 may be a light provided from a headlamp.

In some implementations, based on the distance between the autonomous vehicle 100 and the nearby vehicle 1110, the processor 870 may change an area to which the light 1120 is projected in the space forward of the autonomous vehicle 100.

For example, the processor 870 may gradually reduce the length of travel of the light 1120 as the nearby vehicle 1110 more closely approaches the autonomous vehicle 100 and the distance between the two vehicles becomes shorter. The length of travel of the light 1120 may be in the direction of travel of the autonomous vehicle 100.

As such, the processor 870 may control the light 1120 to be emitted merely sufficient to allow a driver of the nearby vehicle 1110 to recognize a location of the autonomous vehicle 100.

Then, as shown in the example indicated by 1203, the nearby vehicle 1110 may change a lane again to overtake the autonomous vehicle 100.

In this case, based on the distance between the autonomous vehicle 100 and the nearby vehicle 1110, the processor 870 may change an area to which the light 1120 is projected in the space forward of the autonomous vehicle 100.

Then, the nearby vehicle 1110 may accelerate and the distance between the autonomous vehicle 100 and the nearby vehicle 1110 may be greater than the reference distance level, as shown in the example indicated by 1204. In this case, the processor 870 may control the light emitting unit 850 to not emit a light into a space outside the autonomous vehicle 100.

Referring to FIG. 13, the nearby vehicle 1110 may be travelling on a lane of the opposite direction. That is, the nearby vehicle 110 may be a vehicle travelling in the opposite direction.

As shown in the example indicated by 1301, the autonomous vehicle 100 may approach the nearby vehicle 1110 travelling in a lane in the opposite direction.

When a distance between the autonomous vehicle 100 and the nearby vehicle 1110 is equal to or less than a reference distance level, the processor 870 may control the first light emitting unit 851 to emit a light 1120 toward a space forward of the autonomous vehicle 100. The light 1120 may be a light provided from a headlamp.

The processor 870 may control the first light emitting unit 851 to emit the light 1120 in a direction toward the nearby vehicle 1110.

Then, based on the distance between the autonomous vehicle 100 and the nearby vehicle 1110, the processor 870 may change an area to which the light 1120 is projected in the space forward of the autonomous vehicle 100, as shown in the example indicated by 1302. The processor 870 may gradually reduce the length of travel of the light 1120 and the autonomous vehicle 100 more closely approaches the nearby vehicle 1110 in the direction of travel of the autonomous vehicle so the distance between the two vehicles becomes shorter. The length of travel of the light 1120 may be in the direction of travel of the autonomous vehicle 100.

Then, as shown in the example indicated by 1303, the autonomous vehicle 100 and the nearby vehicle 1110 may pass each other. In this case, the processor 870 may control the second light emitting unit 852 to emit a light 1130 toward a space rearward of the autonomous vehicle 100. The light may be a light provided from the rear combination lamps (e.g., a tail lamp).

Thus, the autonomous vehicle 100 may accelerate and thus the distance between the autonomous vehicle 100 and the nearby vehicle 1110 may become greater than the reference distance level, as shown in the example indicated by 1304. In this case, the processor 870 may control the light emitting unit 850 to not emit a light into a space outside the autonomous vehicle 100.

Figure 14:
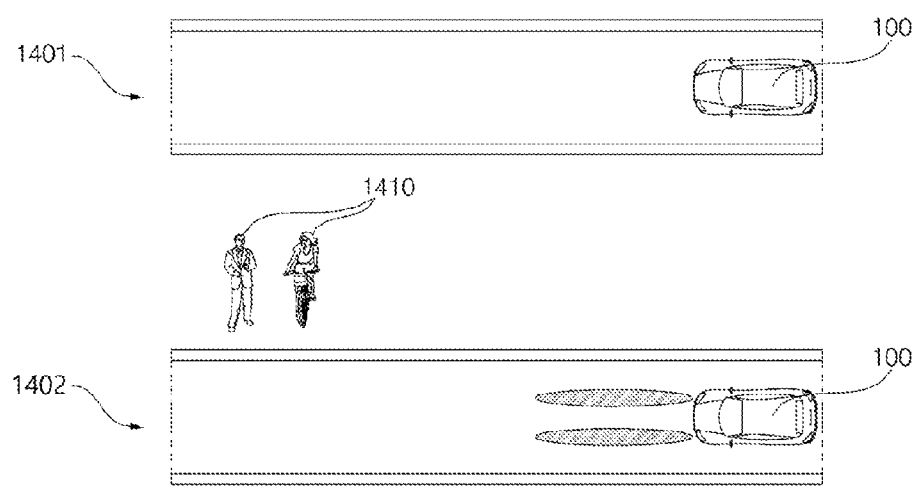
FIG. 14 is a diagram illustrating an example of an operation of a lamp when at least one of a nearby vehicle, a two-wheeled vehicle, or a pedestrian located within a predetermined distance is detected as an object, according to some implementations.

FIG. 14 is a view illustrating operation of a lamp when at least one of a nearby vehicle, a two-wheeled vehicle, and a pedestrian located within a predetermined distance is detected as an object, according to some implementations.

In FIG. 14, the autonomous vehicle 100 may be operating in an autonomous driving state.

Referring to FIG. 14, the processor 870 may acquire, from the interface 830, information on detection of an object 1410 located within a predetermined distance from the autonomous vehicle 100. The object 1410 may include at least one of a nearby vehicle, a two-wheeled vehicle, and a pedestrian.

If object information is not acquired when the autonomous vehicle 100 is operating in the autonomous driving state, the processor 870 may control the light emitting unit 850 to not emit a light into a space outside the autonomous vehicle 100, as shown in the example indicated by 1401.

If information on an object 1410 is acquired when the autonomous vehicle 100 is operating in the autonomous driving state, the processor 870 may control the light emitting unit 850 to emit a light into a space outside the autonomous vehicle 100, as shown in the example indicated by 1402.

In some implementations, based on a distance between the autonomous vehicle 100 and the object 1410, the processor 870 may change an area to which a light is projected in the space outside of the autonomous vehicle 100.

For example, the processor 870 may control the light emitting unit 850 to emit a light in a direction toward the object 1410.

Figure 15:
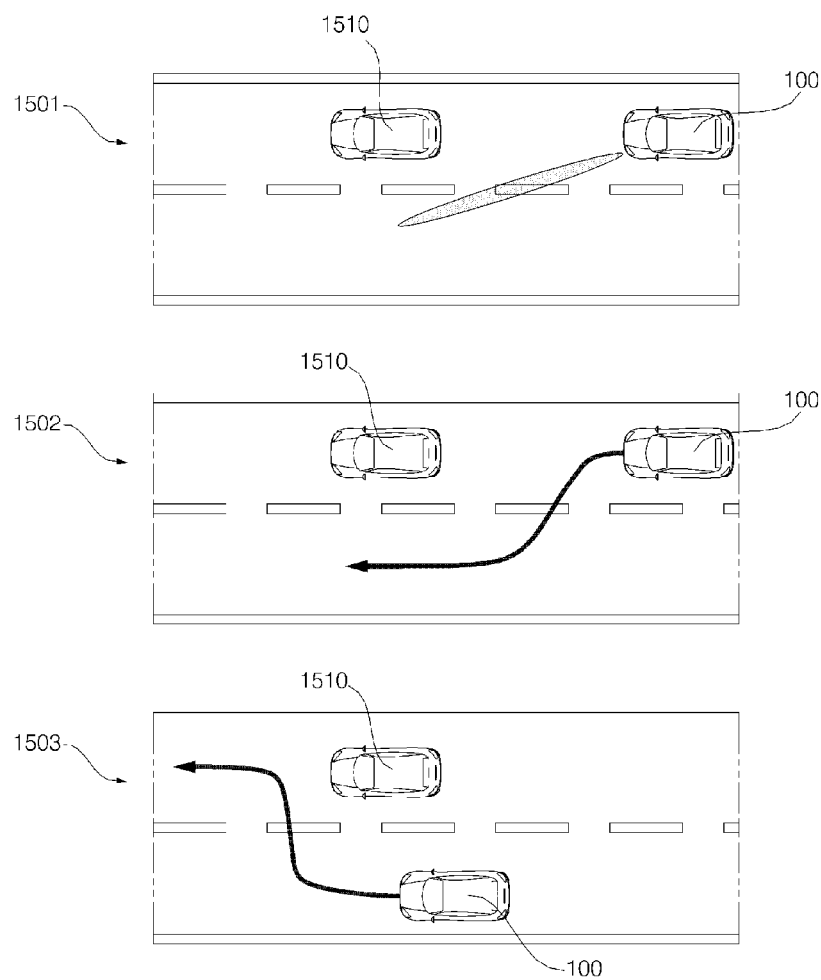
FIGS. 15 to 16 are diagrams illustrating examples of operations of a lamp which displays a visual image corresponding to route information, according to some implementations.
Figure 16:
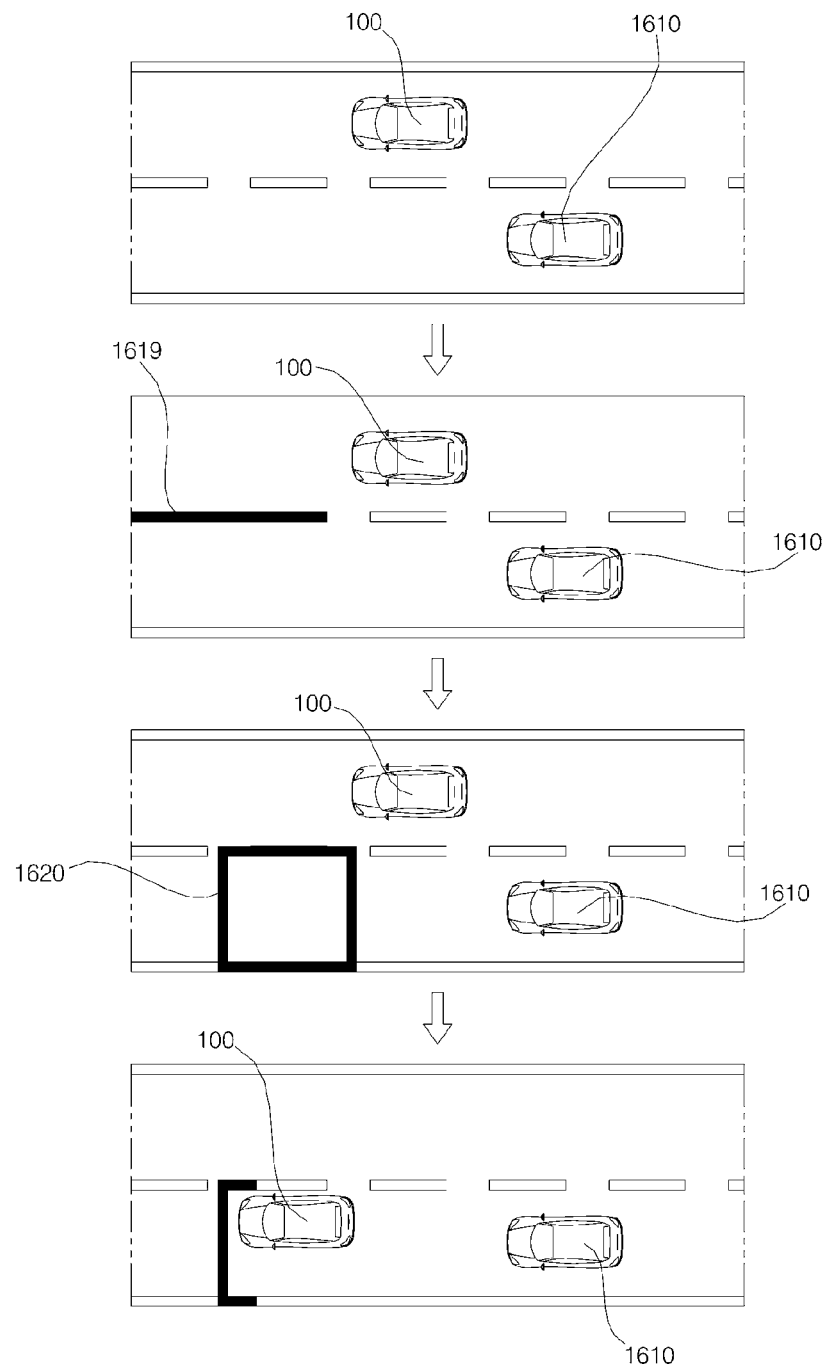

FIGS. 15 to 16 are views illustrating operation of a lamp which displays a visual image corresponding to route information, according to some implementations.

In FIGS. 15 to 16, the autonomous vehicle 100 may be operating in an autonomous driving state.

Referring to FIG. 15, the processor 870 may receive route information of the autonomous vehicle 100 from the navigation system 770 via the interface 830.

The processor 870 may acquire, via the interface 830, information on detection of an object 1510 located within a predetermined distance from the autonomous vehicle 100. The object 1510 may include at least one of a nearby vehicle, a two-wheeled vehicle, and a pedestrian.

The processor 870 may control the light emitting unit 850 to display an image corresponding to route information in a space outside the autonomous vehicle 100, as shown in the examples indicated by 1501, 1502, and 1503. In this case, the processor 870 may control the light emitting unit 850 to emit a light in a direction toward the detected object 1510.

Alternatively, the processor 870 may control the light emitting unit 850 to emit a light in a direction in which a route proceeds.

Referring to FIG. 16, when it is necessary for the autonomous vehicle 100 to change a lane, the processor 870 may receive lane change information. The lane change information may be included in the route information.

The processor 870 may acquire, via the interface 830, information on detection of an object 1610 located within a predetermined distance from the autonomous vehicle 100. The object 1610 may include at least one of a nearby vehicle, a two-wheeled vehicle, and a pedestrian.

The processor 870 may control the light emitting unit 850 to emit a light toward a line 1619 which the autonomous vehicle 100 needs to cross for lane changing. The emitted light may be a light that covers the line 1619.

The processor 870 may control the light emitting unit 850 to display an image in an area corresponding to a target lane to which the autonomous vehicle 100 is about to move. The image may have a size corresponding to the size of the autonomous vehicle 100.

Then, the autonomous vehicle 100 may cross the line to change a lane.

Figure 17:
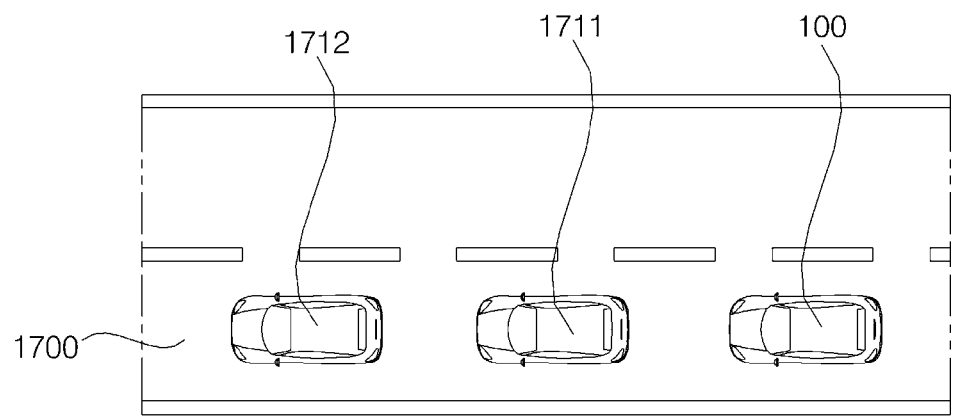
FIG. 17 is a diagram illustrating an example of an operation of a lamp based on information on a road on which the autonomous vehicle is travelling, according to some implementations.

FIG. 17 is a view illustrating operation of a lamp based on information on a road on which the autonomous vehicle is travelling, according to some implementations.

In FIG. 17, the autonomous vehicle 100 may be operating in an autonomous driving state.

Referring to FIG. 17, the processor 870 may receive, via the interface 830, information on a road on which the autonomous vehicle 100 is travelling.

The information on a road on which the autonomous vehicle 100 is travelling may be acquired from the object detection device 300 or the communication device 400.

When the autonomous vehicle 100 is travelling on an autonomous vehicle-only road 1700, the processor 870 may include information on the autonomous vehicle-only road 1700.

In this case, the processor 870 may control the light emitting unit 850 to not emit a light into a space outside the autonomous vehicle 100.

The autonomous vehicle-only road 1700 is a road on which only autonomous vehicles are allowed to enter and travel. That is, vehicles 100, 1711, and 1712 travelling on the autonomous vehicle-only road 1700 are autonomous vehicles which are operating in an autonomous driving state. When the autonomous vehicle 100 is travelling on the autonomous vehicle-only road 1700, it is not necessary to emit a light to provide visibility or to provide a signal to the outside. As a result, light pollution may be prevented and energy efficiency may improve.

Figure 18:
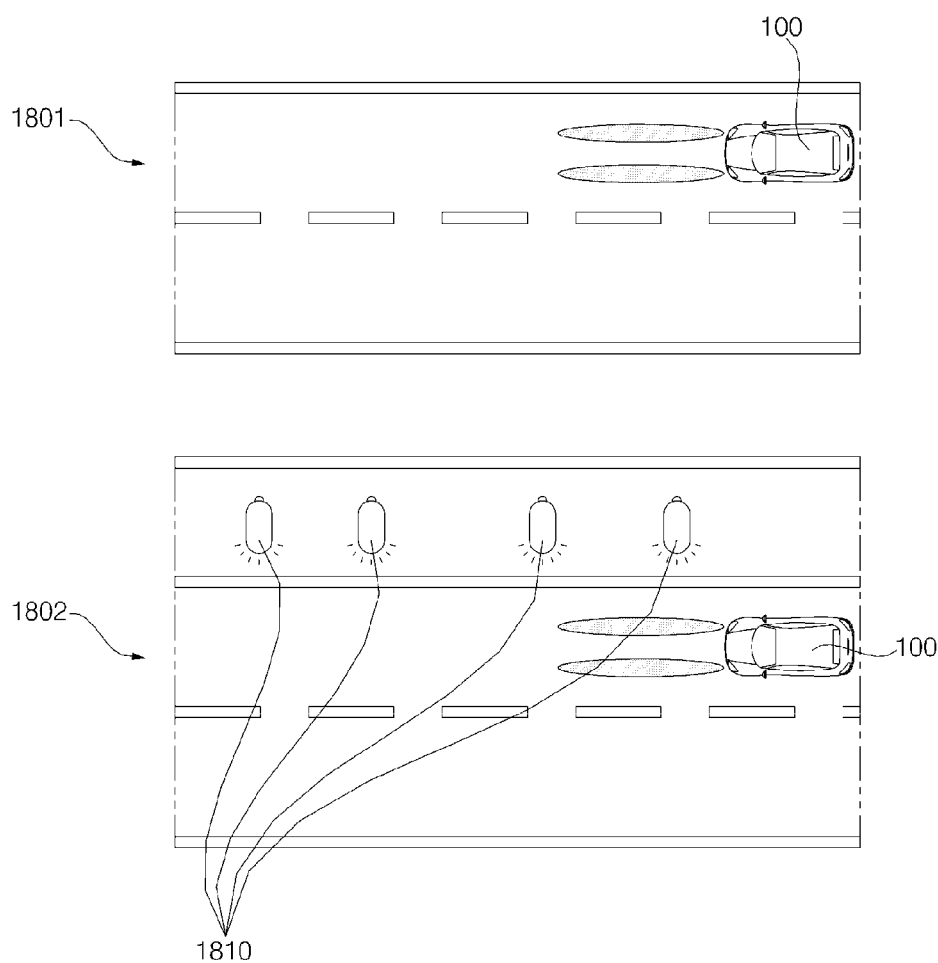
FIG. 18 is a diagram illustrating an example of an operation of a lamp based on ambient illumination information according to some implementations.

FIG. 18 is a view illustrating operation of a lamp based on ambient illumination information according to some implementations.

In FIG. 18. the autonomous vehicle 100 may be operating in an autonomous driving state.

Referring to FIG. 18, the processor 870 may receive ambient illumination information of the autonomous vehicle 100 from sensing unit 120 via the interface 830.

The processor 870 may control the light emitting unit 850 to make change of a light based on the information on ambient illumination.

If the autonomous vehicle 100 needs to emit a light while travelling on a road along which light sources 1810 are positioned, the light may be much brighter than when the autonomous vehicle 100 travels on a road along which no light source is positioned.

In this manner, it is possible to acquire an image from the camera 310 and obtain more accurate information based on the acquired image.

Figure 19:
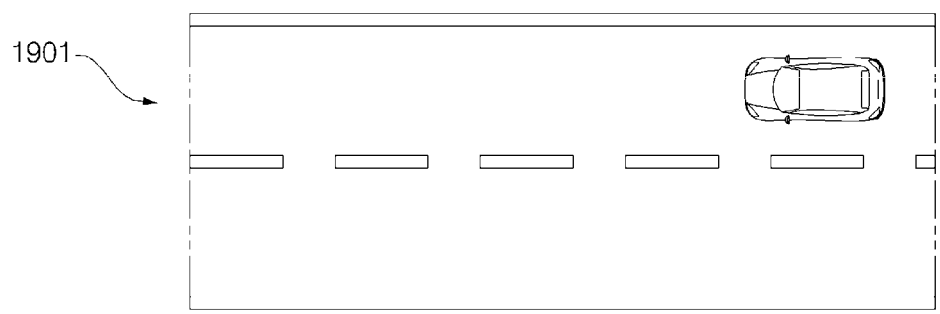
FIG. 19 is a diagram illustrating an example of an operation of a lamp based on information regarding an object detection sensor being used in an autonomous driving mode, according to some implementations.
Figure 19:
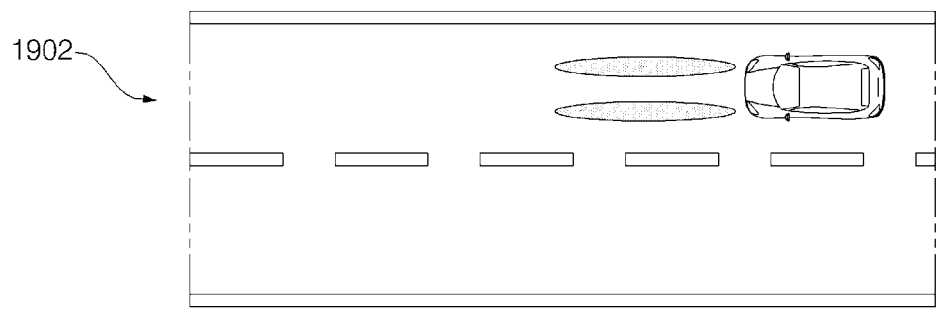

FIG. 19 is a view illustrating operation of a lamp based on information on an object detection sensor being used in an autonomous driving state, according to some implementations.

In FIG. 19, the autonomous vehicle 100 may be operating in an autonomous driving state.

Referring to FIG. 19, the processor 870 may receive, via the interface 830, information on an object detection sensor being used in the autonomous driving state. The processor 870 may control the light emitting unit 850 based on the information on the object detection sensor.

If the radar 320, the lidar 330, the ultrasonic sensor 340, or the infrared sensor 350 is used as an object detection sensor, the processor 870 may control the light emitting unit 850 to not emit a light into a space outside the autonomous vehicle 100, as shown in the example indicated by 1901.

The radar 320, the lidar 330, the ultrasonic sensor 340, and the infrared sensor 350 does not need a visible light, and an emit light may even disturb detecting an object.

If the camera 310 is used as an object detection sensor, the processor 870 may control the light emitting unit 850 to emit a light into a space outside the autonomous vehicle 100, as shown in the example indicated by 1902.

To acquire an image at night using the camera 310, a visible light is required. In this case, the processor 870 may control the light emitting unit 850 to emit a visible light to acquire an image using the camera 310. In this case, the processor 870 may control the light emitting unit 850 to emit a light in a direction that the camera 310 faces to capture an image.

In some implementations, the processor 870 may control an amount of light to be emitted based on a type of a sensor being used as an object detection sensor.

For example, if the camera 310 is a sensor in use, the processor 870 may control the light emitting unit 850 to emit a first-level amount of light.

In another example, if the lidar 330 is a sensor in use, the processor 870 may control the light emitting unit 850 to emit a second-level amount of light.

In yet another example, if the infrared sensor 350 is a sensor in use, the processor 870 may control the light emitting unit 850 to emit a third-level amount of level.

Each sensor may require a different amount of light. Since an amount of light to be emitted from the lamp is controlled based on a sensor in use, object detection may be performed more accurately.

Figure 20:
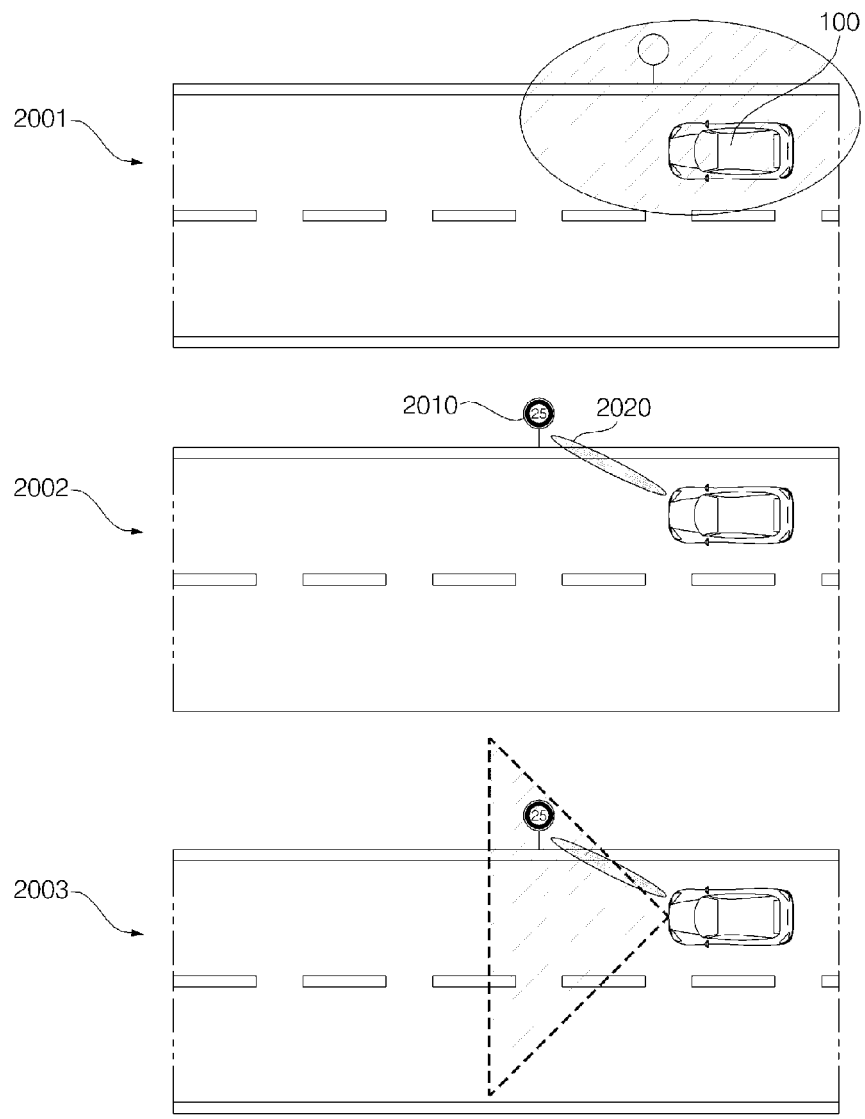
FIG. 20 is a diagram illustrating an example of an operation of a lamp which projects a spotlight to a detected object, according to some implementations.

FIG. 20 is a view illustrating operation of a lamp which projects a spotlight to a detected object, according to some implementations.

In FIG. 20, the autonomous vehicle 100 may be operating in an autonomous driving state.

Referring to FIG. 20, the processor 870 may receive, via the interface 830, information on a detected object. The object may include a pedestrian, a two-wheeled vehicle, and a traffic sign plate.

The processor 870 may control the light emitting unit 850 to emit a light of a predetermined range toward the object. The light of a predetermined range may be referred to as a spotlight.

As shown in the example indicated by 2001, the processor 870 may receive information on a traffic sign plate 2010 detected by the radar 320 or the lidar 330.

As shown in the example indicated by 2002, the processor 870 may control a spotlight 2020 to be emitted toward the traffic sign plate 2010.

Then, the camera 310 may acquire an image of the traffic sign plate 2010 using the spotlight 2020 and detect the traffic sign plate 2010, as shown in the example indicated by 2003.

FIGS. 21A to 21D are views illustrating operation of a lamp when an autonomous vehicle is travelling in a group, according to some implementations.

Figure 21A:
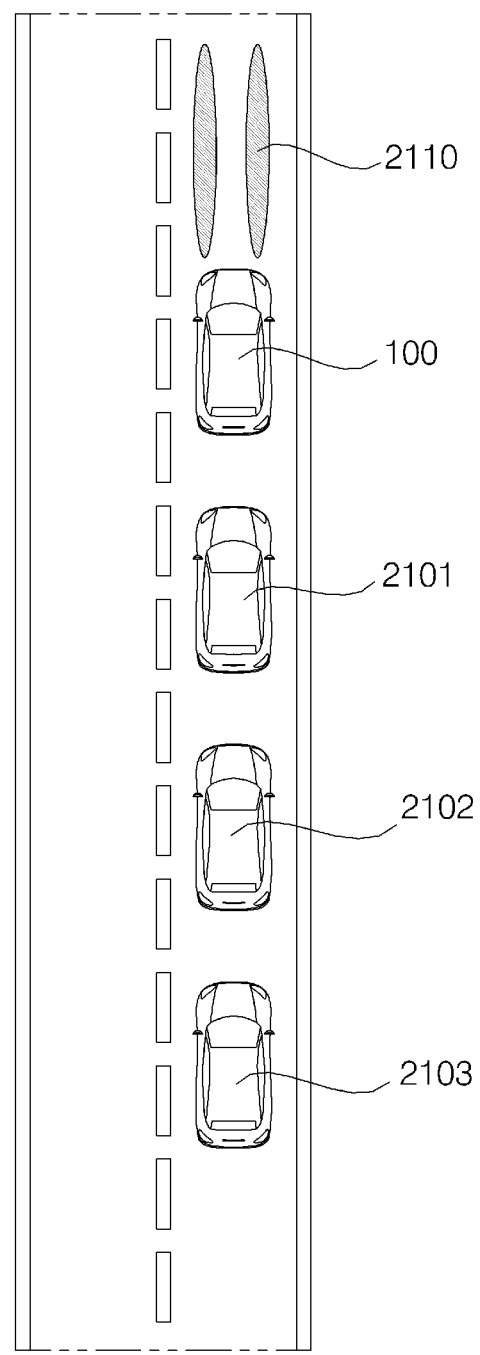
FIGS. 21A to 21D are diagrams illustrating examples of operations of a lamp when an autonomous vehicle is travelling among a group of vehicles, according to some implementations.
Figure 21B:
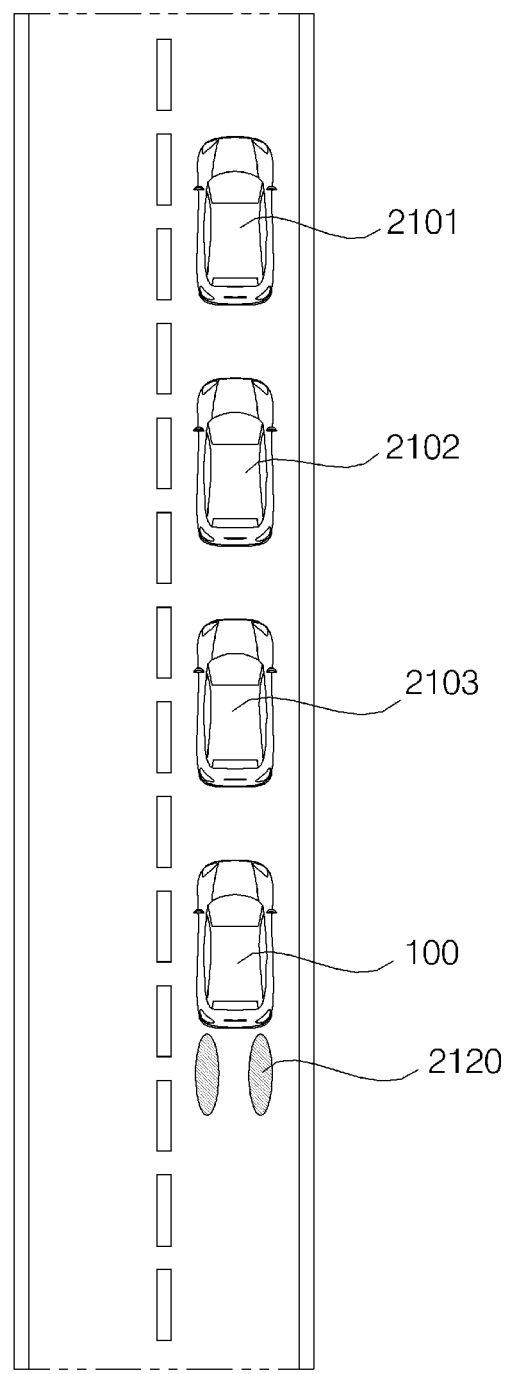
Figure 21C:
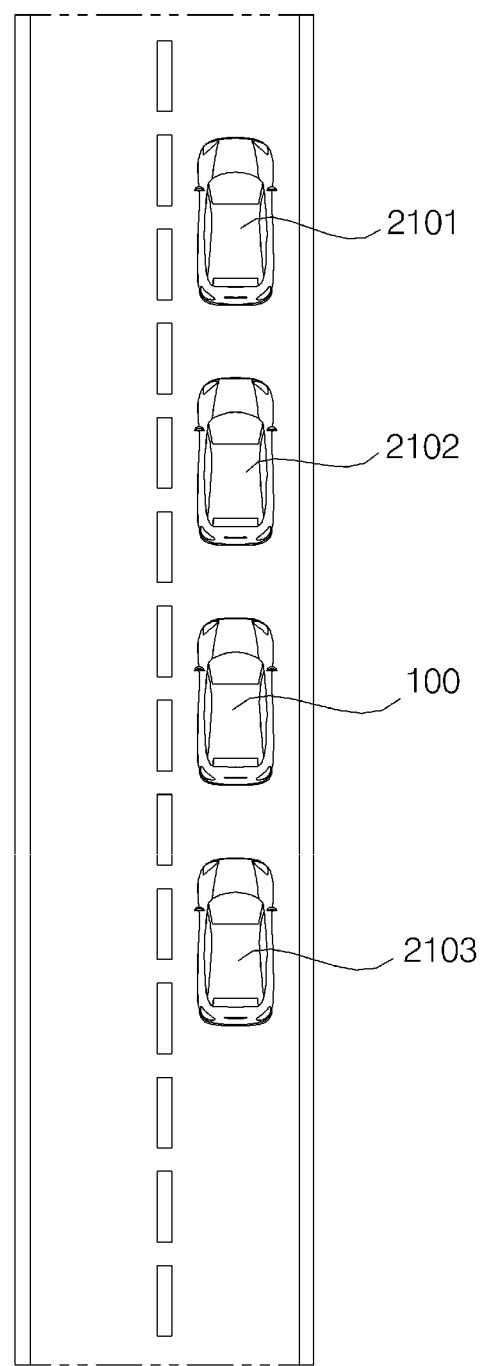

In FIGS. 21A to 21C, the autonomous vehicle 100 may be operating in an autonomous driving state.

Referring to the drawings, the autonomous vehicles 100 may travel in a group with a plurality of vehicles 2101, 2102, and 2103.

The processor 870 may control the light emitting unit 850 based on a position of the autonomous vehicle 100 in the group.

If the autonomous vehicle 100 travels in a group with a plurality of other vehicles, the processor 870 may receive information on the position of the autonomous vehicle 100 in the group from the object detection device 300 or the communication device 400 via the interface 830.

In some implementations, the driving situation information may further include information on a position of the autonomous vehicle 100 in a group.

As illustrated in FIG. 21A, if the autonomous vehicle 100 is a lead vehicle in the group, the processor 870 may control the first light emitting unit 851 to emit a light 2110 toward a space forward of the autonomous vehicle 100. That is, the processor 870 may drive a headlamp of the autonomous vehicle 100.

As illustrated in FIG. 21B, if the autonomous vehicle 100 is the last following vehicle in the group, the processor 870 may control the second light emitting unit 852 to emit a light 2120 toward a space rearward of the autonomous vehicle 100. That is, the processor 870 may drive the rear combination lamps of the autonomous vehicle 100 to operate a tail lamp or a brake lamp.

As illustrated in FIG. 21C, the autonomous vehicle 100 is neither the lead vehicle nor the last following vehicle in the group, the processor 870 may control the light emitting unit 850 to not emit a light into a space outside the autonomous vehicle 100.

Figure 21D:
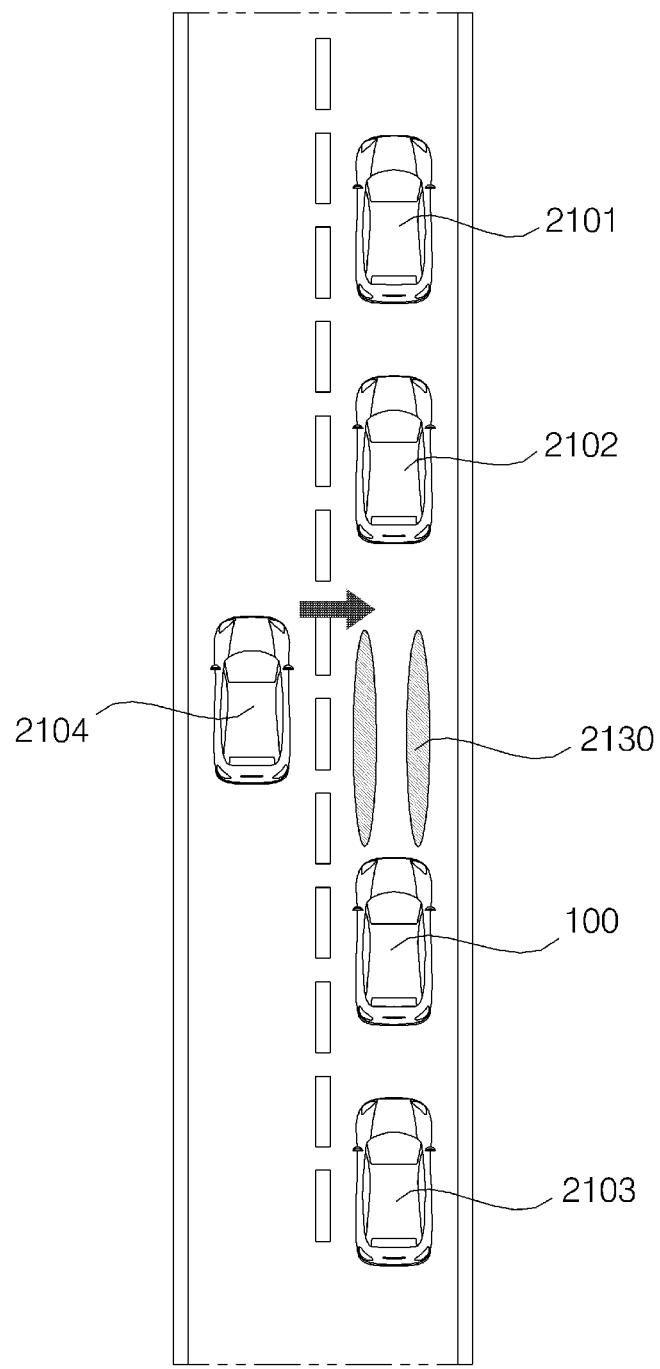

If a nearby vehicle 2104 wants to join the group travelling in a case where the autonomous vehicle 100 is neither the lead vehicle nor the last following vehicle in the group, as illustrated in FIG. 21D, the processor 870 may control the light emitting unit 850 to emit a light 2130 to guide the nearby vehicle 2104 to join.

FIGS. 22A to 22G are views illustrating operation of a lamp in various situations which could happen in an autonomous driving state, according to some implementations.

In FIGS. 22A to 22G, the autonomous vehicle 100 may be operating in an autonomous driving state.

Figure 22A:
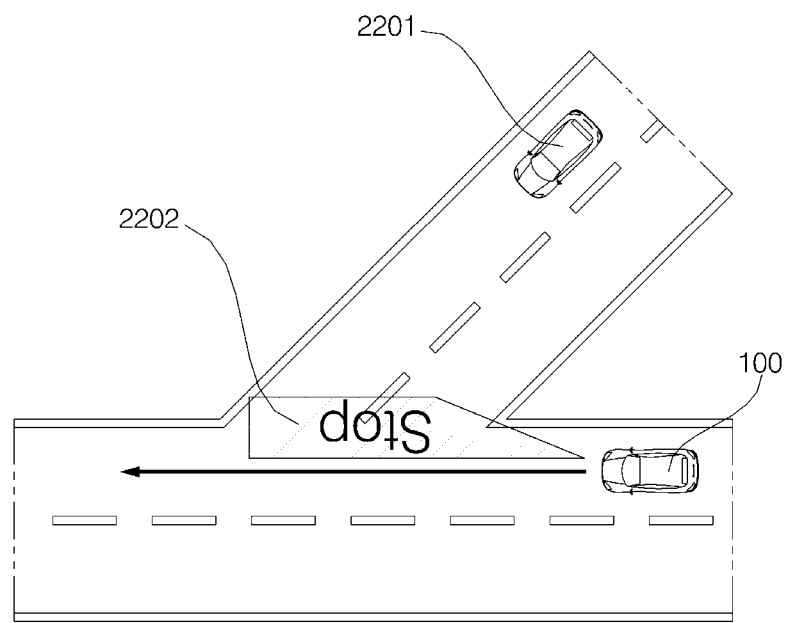
FIGS. 22A to 22G are diagrams illustrating operations of a lamp in various situations in an autonomous driving state, according to some implementations.
Figure 22A:
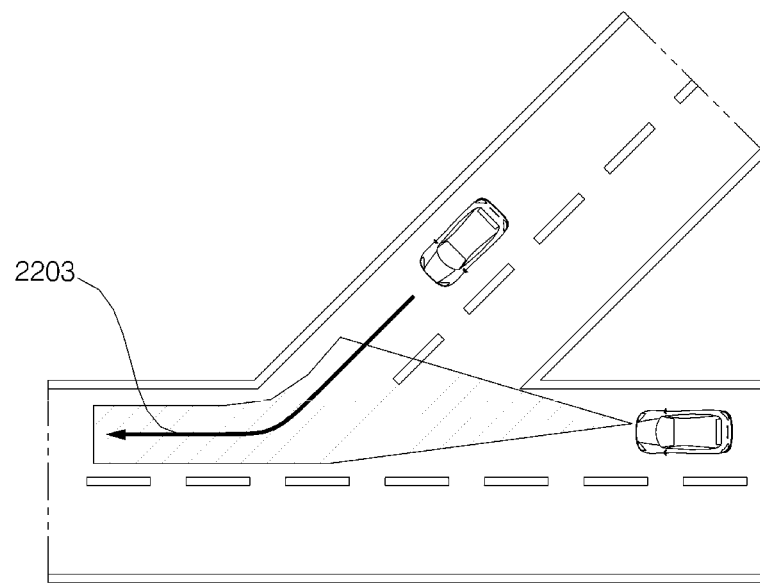

As illustrated in FIG. 22A, the autonomous vehicle 100 may pass through a road junction. The processor 870 may acquire information on detection of a nearby vehicle 2201 which is now travelling in a lane different from the lane of travel the vehicle 100 and about to move to the lane of travel of the autonomous vehicle 100.

If the autonomous vehicle 100 wants to go before the nearby vehicle 2201, the processor 870 may control the third light emitting unit 853 to display an image 2202 in a space forward of the nearby vehicle 2201 to guide the nearby vehicle 2201 to follow the autonomous vehicle 100.

If the autonomous vehicle 100 wants to go after the nearby vehicle 2201, the processor 870 may control the third light emitting unit 853 to display an image 2203 in a space forward of the nearby vehicle 2201 to guide the nearby vehicle 2201 to go before the autonomous vehicle 100.

Figure 22B:
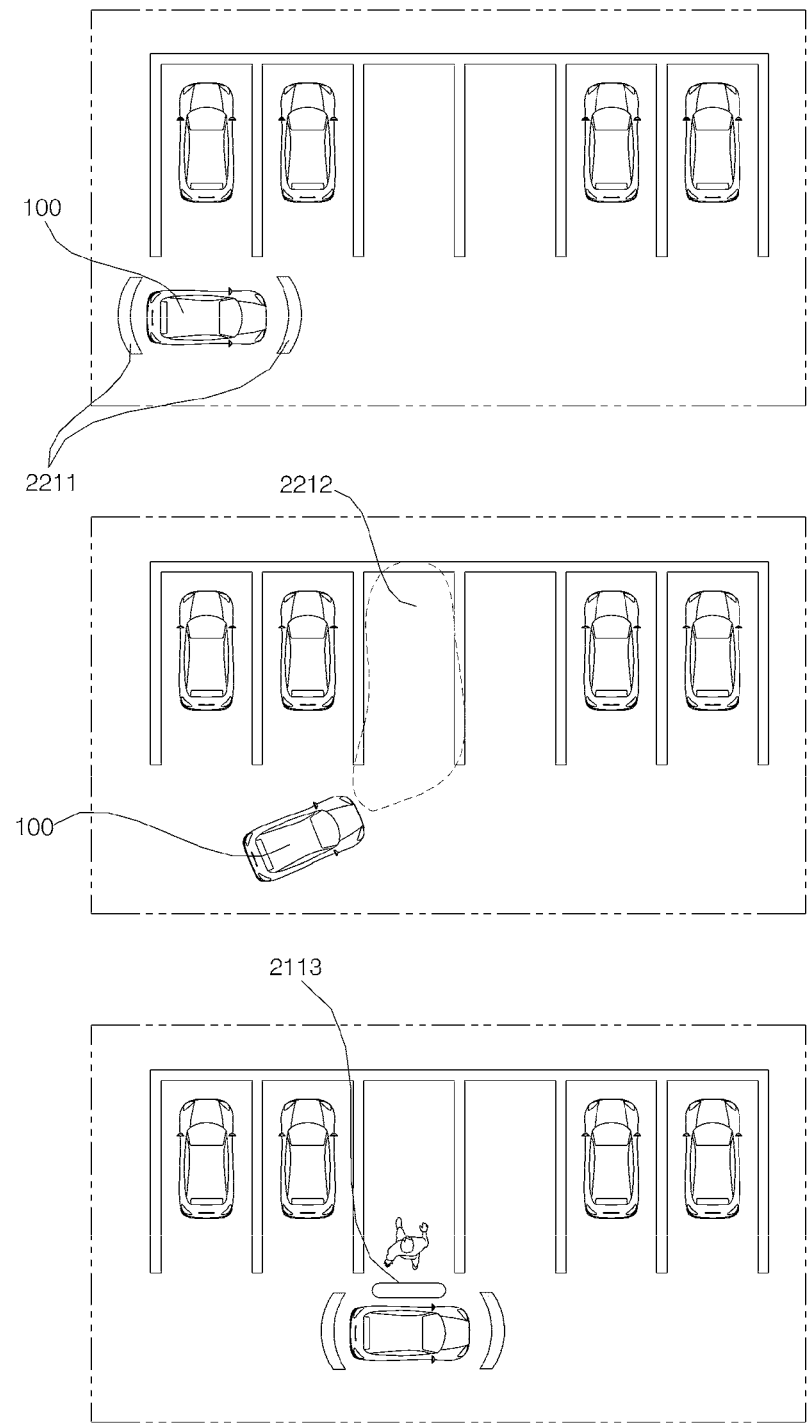

As illustrated in FIG. 22B, the autonomous vehicle 100 may perform autonomous parking. To perform autonomous parking, the processor 870 may control the third light emitting unit 853 to display an image 2211 corresponding to information indicating an autonomous parking state.

The autonomous vehicle 100 may specify a parking space. The processor 853 may control the third light emitting unit 853 to display an image 2212 in the specified parking space to notify the parking of the autonomous vehicle 100.

When an occupant wants to get off, the autonomous vehicle 100 may control the third light emitting unit 853 to display an image, corresponding to an occupant getting-off information, in a space outside the autonomous vehicle 100.

Figure 22C:
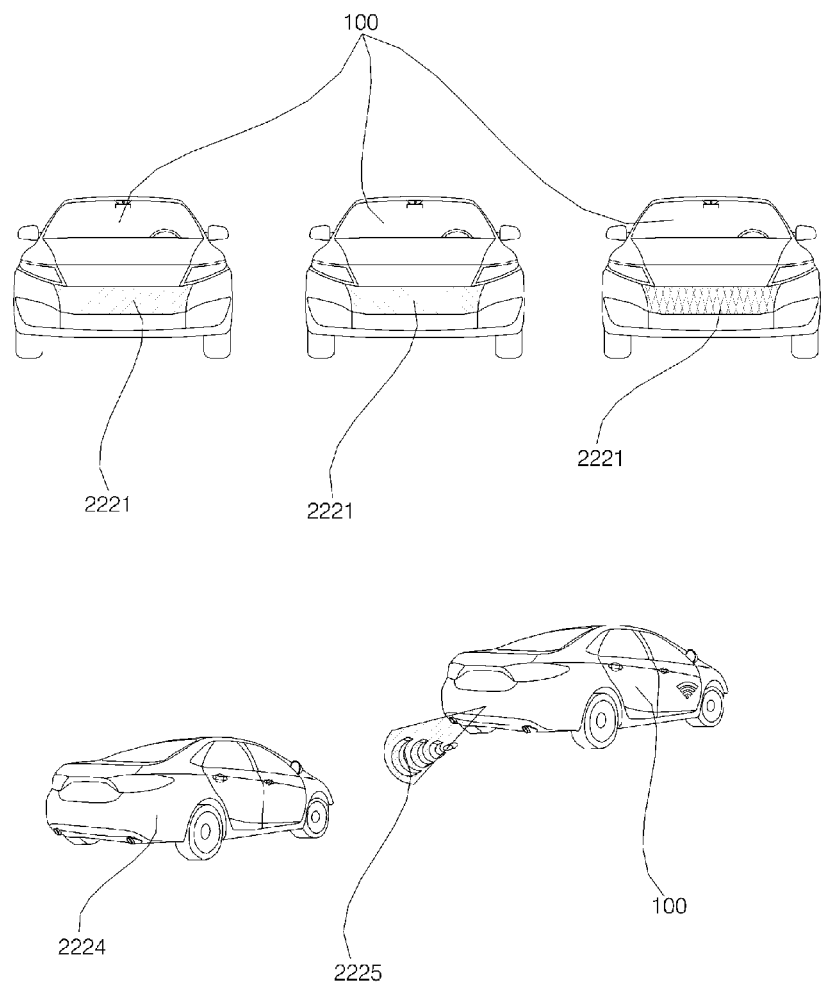

As illustrated in FIG. 22C, the processor 870 may control a light pattern based on driving state information of the autonomous vehicle 100. The light pattern may be a concept including color, illumination, and a flashing period of a light The driving state information may include, for example, information about whether the autonomous vehicle 100 is operating in an autonomous driving state, a manual driving state, or a semi-autonomous driving state. Accordingly, the autonomous vehicle 100 may control emission of a light pattern based on the particular driving state.

For example, in some driving states, the processor 870 may control the light emitting unit 850 to emit a light in a first light pattern 2221. Such scenarios may include an autonomous driving state.

As another example, in some driving states, the processor 870 may control the light emitting unit 850 to emit a light in a second light pattern 2222. Such scenarios may include a manual driving state.

As yet another example, in some driving states, the processor 870 may control the light emitting unit 850 to emit a light in a third light pattern 2223. Such scenarios may include semi-autonomous driving state.

In some implementations, the processor 870 may control a pattern of a light based on information on a distance to a following vehicle 2224.

For example, if the distance to the following vehicle 2224 falls within a first range, the processor 870 may control a light to be emitted in a first pattern.

In another example, if the distance to the following vehicle 2224 falls within a second range, the processor 870 may control a light to be emitted in a second pattern.

Figure 22D:
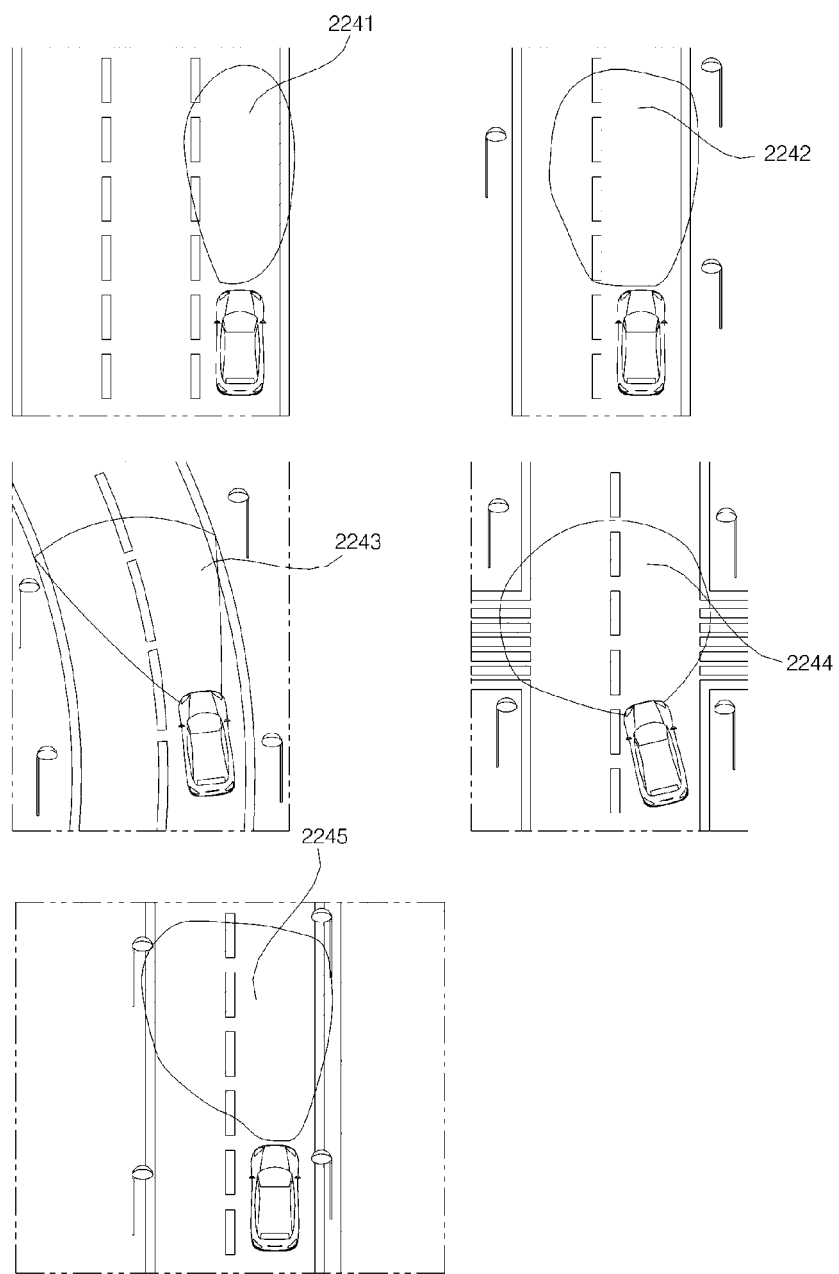

As illustrated in FIG. 22D, the processor 870 may control a pattern of a light based on information on a road on which the autonomous vehicle 100 is travelling.

For example, if the autonomous vehicle 100 is travelling on a highway, the processor 870 may control the light emitting unit 850 to extend the length of a light 2241 in proportion to the speed of the autonomous vehicle 100.

In another example, if the autonomous vehicle 100 is travelling on a local highway, the processor 870 may control the light emitting unit 850 to emit a light 2242 onto the lane of travel of the autonomous vehicle 100 and a lane travelling in the opposite direction.

In yet another example, if the autonomous vehicle 100 enters a curved roadway, the processor 870 may control a direction of a light 2243 based on curvature of the curved road. The processor 870 may control the light emitting unit 850 to emit a light 2243 in a left direction.

In yet another example, if the autonomous vehicle 100 enters an intersection, the processor 870 may control the light emitting unit 850 to emit a light 2244 that covers the entire intersection area.

In yet another example, if the autonomous vehicle 100 is travelling on a road in city, the processor 870 may control the light emitting unit 850 to emit a light 2245 that covers a roadway and a sidewalk.

Figure 22E:
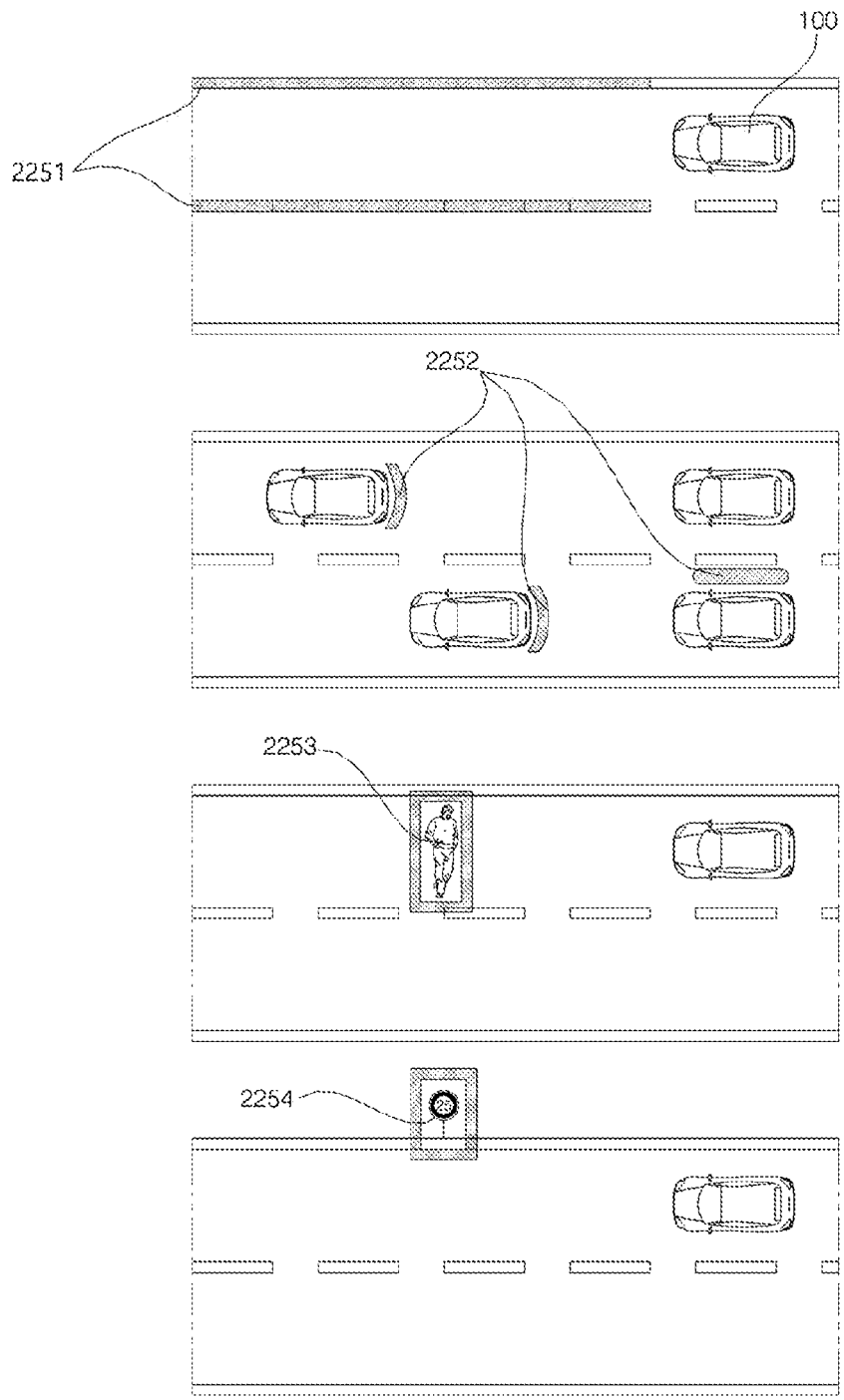

As illustrated in FIG. 22E, the processor 870 may control the light emitting unit 850 based on an object located in the vicinity of the autonomous vehicle 100.

The object may include a lane, a nearby vehicle, a pedestrian, and a traffic sign plate.

The processor 870 may control the light emitting unit 850 to emit a light 2251 that covers a lane on which the autonomous vehicle 100 is travelling.

The processor 870 may control the light emitting unit 850 to emit a light 2252 corresponding to a nearby vehicle to recognize the nearby vehicle.

The processor 870 may control the light emitting unit 850 to emit a light 2253 corresponding to a pedestrian to recognize the pedestrian.

The processor 870 may control the light emitting unit 850 to emit a light 2254 corresponding to a traffic sign plate to recognize the traffic sign plate.

Figure 22F:
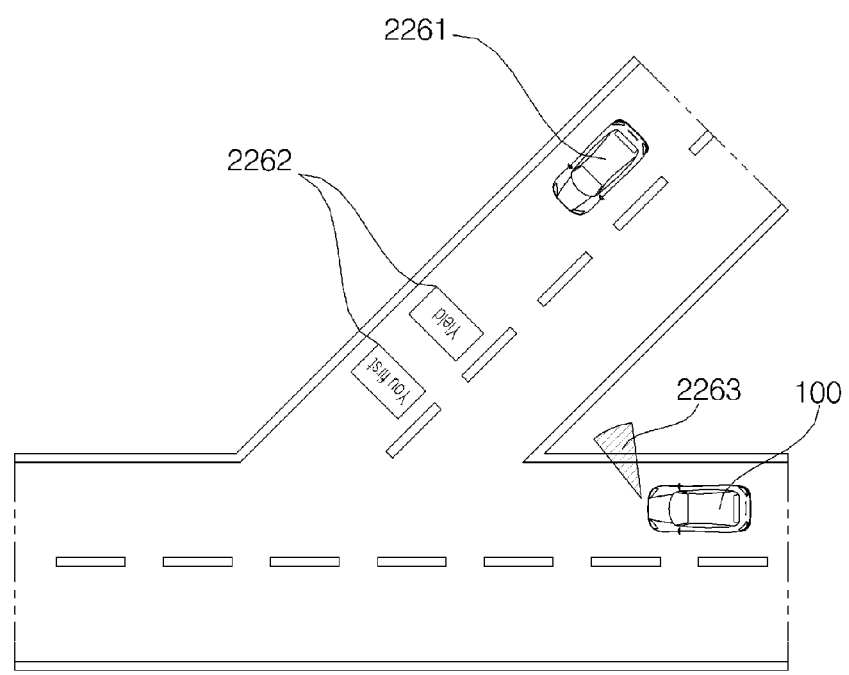

As illustrated in FIG. 22F, if a specific signal 2262 is received from a nearby vehicle 2261, the processor 870 may control a light to be emitted toward the nearby vehicle 2261 to notify that the signal 2262 is recognized. The emitted light may be referred to as a feedback light.

In some implementations, the signal 2262 received from the nearby vehicle 2261 may be an optical signal.

Figure 22G:
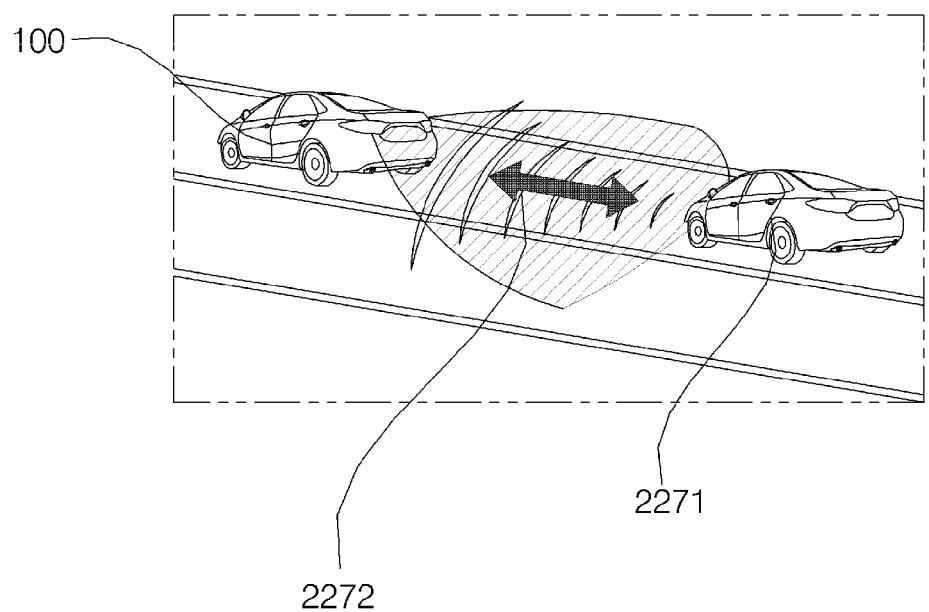

As illustrated in FIG. 22G, in response to a lane change signal received from a nearby vehicle 2271, the processor 870 may control a light 2272 to be emitted toward the nearby vehicle 2271 to notify that the signal is recognized.

Implementations described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered byway of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lamp of an autonomous vehicle, comprising:
   at least one light emitting unit; and
   at least one processor configured to:
      in a first state in which the autonomous vehicle is operating in a manual driving state, control the at least one light emitting unit to emit a light into a space outside the autonomous vehicle; and
      in a second state in which the autonomous vehicle is transitioned from the manual driving state to an autonomous driving state, control the at least one light emitting unit to not emit a light into the space outside the autonomous vehicle.

2. The lamp according to claim 1, wherein the at least one processor is further configured to, in a third state in which the autonomous vehicle is transitioned from the autonomous driving state to the manual driving state:
   control the at least one light emitting unit to emit a light into the space outside the autonomous vehicle.

3. The lamp according to claim 1, further comprising an interface configured to receive driving situation information, wherein the at least one processor is configured to control the at least one light emitting unit based on the driving situation information.

4. The lamp according to claim 3, wherein the driving situation information comprises at least one of the following: information regarding an object located in the vicinity of the autonomous vehicle, information regarding a road on which the autonomous vehicle is travelling, ambient illumination information, navigation information, or information regarding an object detection sensor being used by the autonomous vehicle in the autonomous driving state.

5. The lamp according to claim 4,
   wherein the information regarding the object comprises information regarding a nearby vehicle travelling in the vicinity of the autonomous vehicle, and
   wherein the at least one processor is further configured to, in a fourth state in which the autonomous vehicle is operating in the autonomous driving state, control the at least one light emitting unit based on the information regarding the nearby vehicle.

6. The lamp according to claim 5,
   wherein the information regarding the nearby vehicle comprises information as to whether the nearby vehicle is a manually driven vehicle, and
   wherein the at least one processor is further configured to, in the fourth state in which the autonomous vehicle is operating in the autonomous driving state, control the at least one light emitting unit to emit a light into the space outside the autonomous vehicle in response to the nearby vehicle being determined to be a manually driven vehicle.

7. The lamp according to claim 6, wherein the at least one processor is further configured to control the at least one light emitting unit based on a distance between the autonomous vehicle and the nearby vehicle.

8. The lamp according to claim 7, wherein the at least one processor is further configured to:
   based on the distance between the autonomous vehicle and the nearby vehicle being equal to or less than a threshold distance, control the at least one light emitting unit to emit a light into the space outside the autonomous vehicle.

9. The lamp according to claim 4,
   wherein the information regarding the object comprises information regarding at least one of a nearby vehicle, a two-wheeled vehicle, or a pedestrian being located within a threshold distance from the autonomous vehicle, and
   wherein the at least one processor is further configured to, in a fourth state in which the autonomous vehicle is operating in the autonomous driving state, control the at least one light emitting unit to emit a light into the space outside the autonomous vehicle in response to acquisition of the information regarding the object.

10. The lamp according to claim 9,
    wherein the navigation information comprises route information of the autonomous vehicle, and
    wherein the at least one processor is further configured to control the at least one light emitting unit to display a visual image, corresponding to the route information, in the space outside the autonomous vehicle in a direction toward the object.

11. The lamp according to claim 4,
    wherein the information regarding the road on which the autonomous vehicle is travelling comprises information indicating whether the road is an autonomous-vehicle-only road, and
    wherein the at least one processor is further configured to, based on detecting that the autonomous vehicle is travelling on the autonomous-vehicle-only road, control the at least one light emitting unit to not emit a light into the space outside the autonomous vehicle.

12. The lamp according to claim 4, wherein the at least one processor is configured to control the at least one light emitting unit based on the ambient illumination information by changing an amount of a light to be emitted into the space outside the autonomous vehicle.

13. The lamp according to claim 4, wherein the at least one processor is configured to control the at least one light emitting unit based on the information regarding the object detection sensor being used by the autonomous vehicle in the autonomous driving state.

14. The lamp according to claim 13, wherein the at least one processor is configured to:
    based on detecting that the object detection sensor being used by the autonomous vehicle in the autonomous driving state is a camera, control the at least one light emitting unit to emit a light into the space outside the autonomous vehicle, and
    based on detecting that the object detection sensor being used by the autonomous vehicle in the autonomous driving state is not a camera, control the at least one light emitting unit to not emit a light into the space outside the autonomous vehicle.

15. The lamp according to claim 4, wherein the information regarding the object comprises information regarding at least one of a pedestrian, a two-wheeled vehicle, or a traffic sign plate, and
    wherein the at least one processor is configured to control the at least one light emitting unit to emit a light of a predetermined range toward the at least one of the pedestrian, the two-wheeled vehicle, or the traffic sign plate.

16. The lamp according to claim 1,
    wherein the at least one light emitting unit comprises:
       a first light emitting unit configured to implement a headlamp; and
       a second light emitting unit configured to implement rear combination lamps, wherein the at least one processor is further configured to:
based on a determination that the autonomous vehicle is travelling amongst a group of nearby vehicles, control the at least one light emitting unit based on a position of the autonomous vehicle relative to other vehicles within the group.

17. The lamp according to claim 16, wherein the at least one processor is further configured to:
based on the autonomous vehicle being a lead vehicle in the group, control the first light emitting unit to emit a light toward a space in a forward direction from the autonomous vehicle.

18. The lamp according to claim 16, wherein the at least one processor is further configured to:
based on the autonomous vehicle being a rearmost vehicle in the group, control the second light emitting unit to emit a light toward a space in a rearward direction of the autonomous vehicle.

19. The lamp according to claim 16, wherein the at least one processor is further configured to:
based on the autonomous vehicle neither being a lead vehicle nor a rearmost vehicle in the group, control the light emitting unit to not emit a light into the space outside the autonomous vehicle.

20. A vehicle comprising the lamp according to claim 1.

* * * * *